United States Patent [19]

Fradella

[11] Patent Number: 4,520,300

[45] Date of Patent: May 28, 1985

[54] BRUSHLESS ULTRA-EFFICIENT REGENERATIVE SERVOMECHANISM

[76] Inventor: Richard B. Fradella, 33872 Calle Conejo, San Juan Capistrano, Calif. 92675

[21] Appl. No.: 433,170

[22] Filed: Dec. 6, 1982

[51] Int. Cl.³ .............................................. H02P 3/18
[52] U.S. Cl. .................................... 318/603; 318/138; 318/439; 318/254; 318/661; 310/268
[58] Field of Search ............... 310/156, 268, 114, 184, 310/258; 318/138, 434, 439, 603, 616, 636, 637, 254, 721, 722, 723, 373, 727, 799, 703, 805, 807, 661, 808, 811, 809, 810

[56] References Cited

U.S. PATENT DOCUMENTS

| | | | |
|---|---|---|---|
| 3,696,277 | 10/1972 | Liska et al. | 318/254 X |
| 4,085,355 | 4/1978 | Fradella | 318/703 |
| 4,127,799 | 11/1978 | Nakamura et al. | 318/373 |
| 4,295,083 | 10/1981 | Leenhouts | 318/138 X |
| 4,358,723 | 11/1982 | Scholl et al. | 318/661 |
| 4,371,801 | 2/1983 | Richter | 310/268 X |
| 4,390,865 | 6/1983 | Lauro | 318/661 X |

Primary Examiner—William M. Shoop
Assistant Examiner—Paul Shik Luen Ip

[57] ABSTRACT

A servomechanism regeneratively controls motion by a brushless coreless axial-field motor, exerting torque thru its permanent-magnet disk rotor, resulting from synchronized polyphase sinusoidal stator currents, controlled by a switching controller responsive to input commands and to Hall-effect transducer signals that vary sinusoidally with rotor angle and respectively correspond to stator phases. The controller operates with a dc power source and sink. Its signal processors derive from the transducer signals instantaneous magnitudes and polarities thereof and continuous lagless speed feedback. The instantaneous magnitudes are multiplied by a torque amplitude signal to provide respective synchronized amplitude control signals. Current transformers having primary windings in series with power switching transistors provide current feedback pulses with amplitude proportional to instaneous current in associated stator windings. Pulse control means initiate bi-phase pulses having restricted duty-cycle, and dictate pulse duration by comparing each current feedback pulse with the associated synchronized amplitude control signal. Switching logic responsive to the bi-phase pulses, to forward and reverse drive and brake commands, and to said polarities, accordingly controls selection and duty-cycle of said power switching transistors which, cooperative with free-wheeling diodes and inductors, effect controlled alternating stator currents. Various signal interface means process the input commands with feedback derived from the transducer signals, such as speed, direction of rotation, and interpolated digital position, to provide said torque amplitude signal, and variously, said drive and brake commands; so the motor and controller constitute a complete servomechanism, that provides precise speed and position control with regenerative reversing and braking, ultra-high efficiency, and fast dynamic response.

27 Claims, 12 Drawing Figures

Ｇ
4,520,300

BRUSHLESS ULTRA-EFFICIENT REGENERATIVE SERVOMECHANISM

BACKGROUND OF THE INVENTION

General objectives of the present invention include improving an enhancing brushless regenerative servomechanisms incorporating high-frequency switching control of polyphase stator currents synchronized to rotor position, to achieve greater motor efficiency and power-to-weight ratio, by eliminating high-speed core loss, and greater versatility, ease of application, and usefulness, with less mechanical complexity, quiescent power, and cost, by providing various new feedback and current control circuits.

Specific goals include providing a switching controller having pulse current sensors that detect, without quiescent power, instantaneous stator current, for pulse control of stator current having sub-microsecond loop response time, with signal processing circuits to derive from polyphase sinusoidal transducer signals a continuous lagless speed feedback for motion control having fast dynamic response, with rotation discriminator and up/down counter means for providing digital position feedback to facilitate zero-error speed control and digitally commanded position control, with a digital position readout to facilitate self-programming of sequential digital position commands, and with analog interpolation for improved dynamic response and position control resolution; and to provide a brushless coreless ultra-efficient polyphase synchronous motor having integrated Hall-effect transducers, that does not incur core loss and has maximized stator conductor volume in the magnetic field of the rotor to minimize copper loss, and has a permanent-magnet rotor with closed ironless magnetic paths to minimize stray loss and weight; and to also provide various signal interface combinations that facilitate, without a tachometer or shaft position encoder, brushless motor and controller combinations which provide complete servomechanisms, able to perform a wide range of ultra-efficient regenerative motion control tasks for a variety of useful applications.

My U.S. Pat. No. 4,085,355 for a Variable-Speed Regenerative Brushless Electric Motor and Controller System describes improvements to the prior art and establishes a specialization of the art closely related to the present invention.

Accordingly, the prior art is described and compared with the present invention herein with reference to said patent.

A prominent feature of said patent is a switching current controller and system combination that facilitates use of a polyphase synchronous machine which does not have a brush commutator; and thus no commutator friction, wear, need for periodic maintenance, spark hazard, radio frequency interference, and power dissipation therefrom. Another prominent feature is regenerative reversing and braking; whereby electric power is generated while achieving fully controlled deceleration and braking, the machine can provide full torque continuously while the controller draws only a small fraction of full-load current whenever a mechanical overload prevents rotation, there are no current surges, and permanent-magnet rotors are never subjected to excessive demagnetizing fields because stator current is always controlled within prescribed limits.

Said patent describes current control loops each having an inductively coupled current sensor in series with an associated stator winding, for providing a continuous current feedback signal which is compared with a synchronized amplitude control signal by an operational amplifier (hereinafter referred to as an op-amp) to control stator current by varying duty-cycle of power switching transistors. The required sensor bandwidth includes zero frequency. A drawback of such current control loops is their relatively slow stable response time of a few hundred microseconds. Also, its current sensor is relatively complex and needs a few hundred milliwatts quiescent power supplied above a minimum operating voltage that necessitates an under-voltage lockout to prevent excessive uncontrolled current during power connection and other low supply voltage situations.

Said patent also describes a speed sensor that provides a signal proportional to pulse rate by averaging pulses derived from polarity transitions of the transducer signals, in combination with other circuits, for varying rotor excitation inversely to speed and for limiting speed. Such pulse averaging circuits require a substantial filter lag to avoid unacceptable signal ripple, and are therefore not suitable for servomechanism speed and position control requiring fast response; moreover, the pulse rate can indicate erroneous speed substantially higher than actual if the rotor dithers about a polarity crossover and also if the transducer signal is noisy near crossovers.

The polyphase synchronous machines described in said patent have ferromagnetic cores that variously incur hysteresis and eddy current losses in core laminations subjected to alternating magnetic fields. Core losses therefrom generally increase exponentially with rotor speed according to an exponent of 1.5 to 3 or more, so the machines have high core losses at high rotor speed, especially those with permanent-magnet rotors, because their flux is not reduced at high speed. By way of example, a 12-pole machine with a 6000 revolutions-per-minute (rpm) rotor speed has an electrical frequency of 600 Hz, so its core loss compared to nominal 60 Hz operation would be greater by a factor of about $(600/60)^3$ or 1000 times. Moreover, they also incur core loss due to an inductively coupled high-frequency switching ripple component of stator current; and the inductance of their stator windings is too high to permit effective filtering by low-loss series inductance. Their high stator inductance also results in substantial reactance at high rotor speed that necessitates high supply voltage to accommodate high-speed drive, which increases core losses even more, adds to controller cost and power loss, and hinders effective and efficient regeneration. Further, cogging caused by the reluctance torque of ferromagnetic core machines can be troublesome in servomechanism applications. Additionally, a polyphase transducer, which is not included in conventional machines, must be suitably coupled to the rotor, which generally requires gearing. Furthermore, in fast response speed control servomechanism applications, a tachometer must also be mechanically coupled thereto, for providing speed feedback without excessive filter lags. And in position control applications, a tachometer and shaft position encoder mechanically coupled thereto would generally be needed.

To circumvent the above drawbacks and limitations, the present invention provides complete servomechanisms having none of the drawbacks or limitations and needing none of the mechanically coupled elements described above, without sacrificing any of the advantageous features described; so it can better meet a wide range of special requirements for diverse useful applications.

A prime example is a high-precision digital position control servomechanism that does not require a tachometer or shaft position encoder, having analog interpolated digital position feedback and analog speed feedback for fast dynamic response with regenerative damping, a digital readout for self-programming sequential digital position commands, and variable speed control between consecutive commanded destinations. These capabilities would be useful in industrial robots and machine tools.

Another prime example is a speed control servomechanism, including analog speed feedback and digital speed error integration and correction, combined with analog interpolation of digital position feedback, for providing fast dynamic response and zero speed error relative to a command pulse rate with analog interpolation between pulses. It would be useful in a variety of propulsion applications, turntables, disc and reel drives, multi-camera filming and projecting, rolling mills, and the like.

A potentially important example is a flywheel power storage system, required to have ultra-high efficiency, low quiescent power, very fast dynamic response, and negligible rotor loss, as it operates continuously at variable and very high rotor speeds, magnetically levitated in an evacuated inclosure. The electromechanical storage battery thereby provided would be especially useful as an undergrounded power storage system for solar and wind-powered point-of-use generating plants.

Other important examples include propulsion and regenerative braking for electric cars, buses, trucks, utility vehicles, rail vehicles, mobile and installed lifts and conveyances, wheelchairs and other motive devices for physically handicapped persons, plus a broad array of instrument servos and the like.

In a sailing ship, operating with lead-acid batteries that also ballast a fin keel, it could provide superb auxiliary propulsion and automatically charge the batteries from propeller rotation when sailing under wind power.

The present invention provides a wide range of advantages and enhancements to each of the above diverse examples, as well as to many others.

In accordance with the objectives and goals exemplified above, specific improvements to the controller, motor, and combinations thereof include:

New current sensors provide instantaneous current feedback pulses proportional to inductively coupled current thru the power switching transistors.

New pulse control means, responsive to the synchronized amplitude control signals and to the current feedback pulses, initiate bi-phase pulses and dictate the duration of each pulse, to control on/off time ratios of the power switching transistors; whereby the current feedback pulses are each compared to an associated synchronized amplitude control signal to dictate turn-off times for the associated transistors. This configuration provides stator current control having sub-microsecond loop response times, using rugged and reliable current sensing means that do not required quiescent power and can thus operate satisfactorily with no under-voltage lockout. Its restricted duty-cycle facilitates transformer-coupled drive to the power transistors.

New analog speed sensor means, responsive to the instantaneous frequency of the transducer signals, provide a continuous and lagless speed feedback.

New rotation discriminator means, responsive to the polarities of the transducer signals, provide feedback pulses indicating direction and amount of rotation.

New analog interpolation means provide continuous lagless linearly variable position feedback for digitally and pulse command position control.

A new low-cost circuit derives the absolute value of its input signal.

New signal interface means responsive to a command pulse rate provide signals to control speed with zero error.

New signal interface means, responsive to digital position commands, provide signals for precise position control; and, in a self-programming mode, provide digital readouts of positions reached relative to a reference and consecutively from one to the next.

New pulse queuing means present queued command and feedback pulses, with a prescribed minimum interval therebetween, to an up/down counter, for precise bidirectional speed and position control by a bidirectional variable command pulse rate.

A new low-cost circuit provides a linear speed command from a sawtooth waveform interpolation of command pulse rate.

A new rotor holding permanent-magnet disks and end-disks provides a closed magnetic field pattern therebetween without iron.

New stator rings, juxtaposed in alternation therebetween, one containing, in addition to its polyphase stator windings, corresponding Hall-effect transducers and flux-collection means therefor, conduct polyphase stator current and provide transducer signals that vary sinusoidally with rotor angle and have waveforms matching the electro-motive-force (emf) voltage of the corresponding stator winding.

A distinct stator geometry, molded within a non-ferromagnetic matrix, does not incur core loss or cogging torque, and facilitates low-resistance windings by maximizing their copper volume in the axial magnetic field of the rotor, thereby minimizing copper loss which accounts for practically all of the power dissipation in the motor.

A new flywheel power storage combination is enhanced by the motor, whose rotor incurs virtually zero heat dissipation and thus can spin freely in a vacuum inclosure with minimal heat transfer, and by the controller, which required negligible idling power and whose sub-microsecond response times prevent current surges due to supply and load transients on the dc power lines connected thereto.

These and other innovations, in combination, provide improved servomechanisms having enhanced capabilities and numerous significant advantages over the prior art, as will be clearly and fully set forth in the following description when considered in conjunction with the accompanying drawings, wherein.

DESCRIPTION OF THE INVENTION

Figure 1:
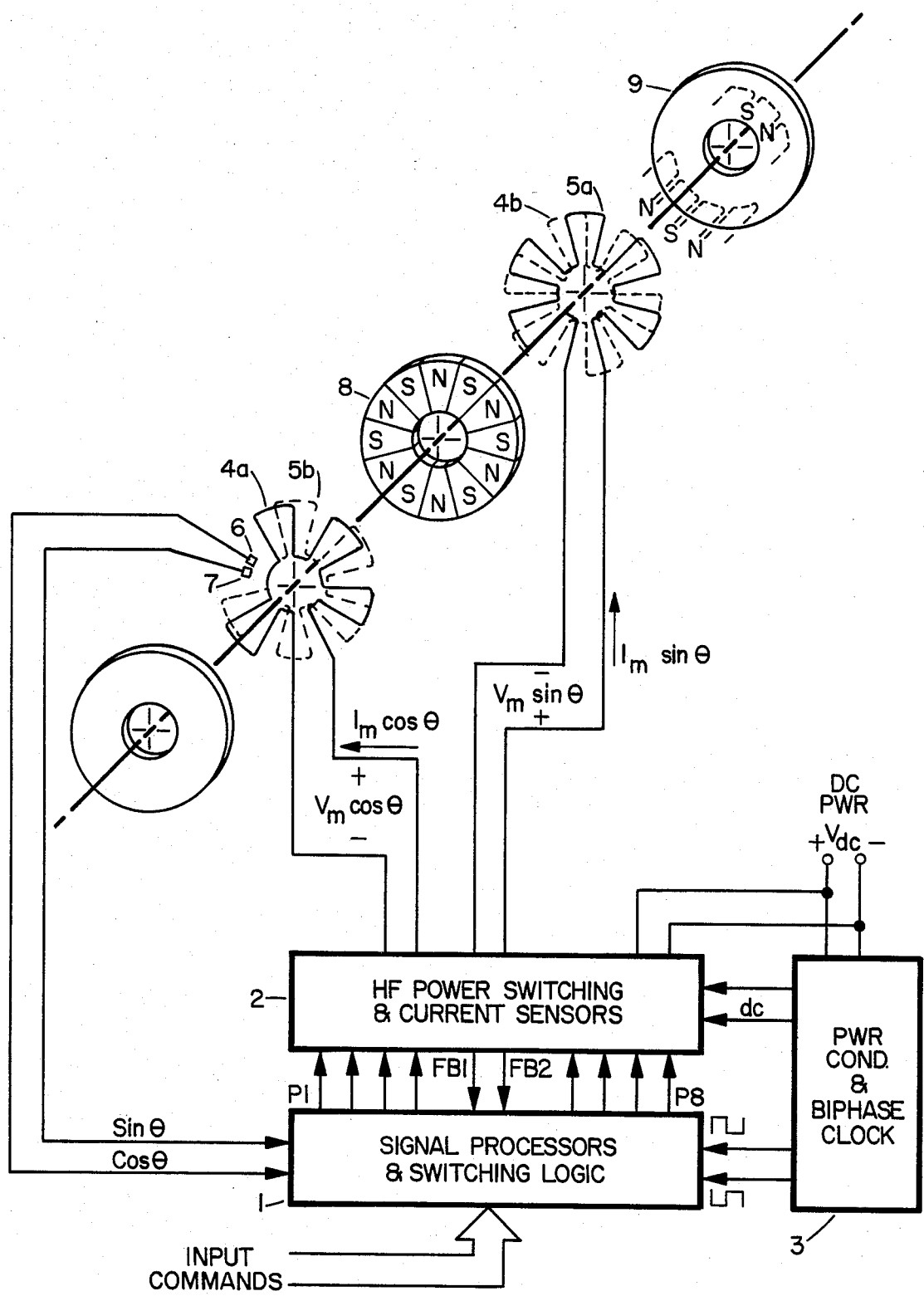
FIG. 1 shows a functional and configurational diagram of a representative servomechanism, having three electronic groups constituting a switching controller, and having a representative 2-phase 12-pole axial-field motor with integral transducers.

A representative servomechanism, having a 2-phase 12-pole motor, is herein briefly described by way of reference to FIG. 1, whereby basic functional groups are defined and related, followed by detailed descriptions of controller and motor elements, with special emphasis to those aspects which are very different from the prior art.

In FIG. 1 the switching controller is represented by functional groups 1, 2, and 3.

Signal processors and switching logic group 1 is variously responsive to input commands, in accordance with a variety of cooperative signal interface means included therewith, for deriving from the transducer signals speed, direction of rotation, and position feedback, for interfacing with the input command means and for accordingly producing control signals. A few examples of said interface means are fully described hereinafter with reference to specific applications. The signal processors receive transducer signals $\sin \theta$ and $\cos \theta$; deriving therefrom instantaneous magnitude and polarity signals, a continuous lagless speed feedback, and variously, a speed error correction by digital speed integration, binary signals indicating the direction of rotation, digital signals variously indicating the direction and distance remaining to reach digitally commanded destinations from reference positions, an analog position feedback interpolation signal, and a digital readout of positions reached by motor jogging control in a self-programming mode. Group 1 also receives high-frequency bi-phase squarewave power, from which it derives dc power for its operation and a bi-phase clock signal for its pulse control circuit. Said pulse control also receives pulse current feedback FB1 and FB2 from respective pulse current sensors. FB1 and FB2 each have instantaneous amplitude proportional to respective instantaneous current thru associated power switching transistors, and thus also proportional to the associated stator winding current. Input commands, transducer signals, clock signals, and pulse current feedback are processed by analog and digital circuits of group 1 to provide switching control signals on lines P1 thru P8 (one for each of eight power switching transistors).

High-frequency power switching and current sensors group 2 is connected to a dc power source and sink from which it draws power to drive the motor and to which it regenerates power to brake and decelerate. It also receives, from the power conditioner of group 3, floating low-voltage dc power for driving its eight power transistors which are selectively switched at a variable duty-cycle to, cooperative with free-wheeling diodes and reactive power filter components, effect controlled alternating current in the respective stator windings. Pulse current thru said transistors, which flows in series with the associated stator winding during transistor conduction, is sensed by current transformers having primary windings in series with the transistors, to provide pulse current feedback FB1 and FB2 from each of the two phases for the pulse control circuit in group 1.

Power conditioner and bi-phase clock group 3 receives dc power and provides floating voltage-regulated current-limited power to groups 1 and 2 at relatively low power levels. Power to group 1 is preferably provided by a floating bi-phase squarewave, at a nominal frequency of 50 KHz, which is also used as a bi-phase clock by the pulse control circuit. Group 3 is preferably constituted by: a low-power switching regulator, for providing, from the dc power source and sink, voltage-regulated and current-limited power to a 50 KHz oscillator and a low-power inverter with transformer-coupled outputs, and full-wave rectifiers that provide low-power low-voltage dc outputs.

Motor elements are illustrated with exaggerated axial separation to clearly reveal fundamental aspects of its representative 2-phase 12-pole stator windings, corresponding transducers, and its 12-pole axial-field permanent-magnet rotor cooperative therewith.

Phase 1 stator windings are illustrated by a single-turn winding 4a (solid line) in a first stator ring and another single-turn winding 4b (dashed line) in a second stator ring. Its two connections to an associated high-frequency power switching circuit in group 2 are shown with current $I_m \cos \theta$ thru the windings and emf $V_m \cos \theta$ across the terminals; said current and emf having instantaneous polarities as noted in FIG. 1 which, of course, are reversed every alternate half-cycle and with each rotation reversal. Windings are typically series connected from one stator ring to the next, which is not shown in FIG. 1, so one of the terminals would typically be connected to a termination of winding 4a and the other to a termination of series-connected winding 4b.

Phase 2 stator windings are similarly illustrated by a single-turn winding 5a (solid line) in the second stator ring and another winding 5b (dashed line) in the first stator ring. It conducts current $I_m \sin \theta$ thru its windings and has voltage $V_m \sin \theta$ across its terminals.

In addition to windings 4a and 5b, which each have two less radial segments and one less outer arc segment than windings 4b and 5a, the first stator ring also contains linear Hall-effect transducer 6 corresponding in space phase angular position (which completes a cycle and repeats every 60° in a 12-pole motor, so positions 60° apart are herein referred to as corresponding relative to each other) with phase 1, and transducer 7 corresponding with phase 2. The centers of transducers 6 and 7 are respectively located 30° from respective centers of the nearest group of radial conductor segments of windings 4a and 5b. Transducers 6 and 7 are 15° apart center-to-center from each other.

Rotor disk magnet 8 has twelve sectors each permanently magnetized along an axial direction such that consecutive sectors have alternating polarities, as illustrated by N and S designating respective North and South axial poles of adjacent sectors. At each end of the rotor, an end-disk magnet 9 provides return magnetic paths that reinforce and close the axial-field pattern of magnet 8, as illustrated in part by the U-shape flux patterns along looping tangential paths in magnet 9 that emerge axially therefrom.

The rotor magnets must maintain a high magnetic flux density thru the high reluctance path of an essentialy coreless stator ring and clearance therefor, incur practically no hysteresis and eddy losses when subjected to high-frequency magnetic field variations due to switching ripple current, and have low permeability for magnetic fields induced by stator current; so that the stator windings each have low inductance, thereby permitting a small very-low-loss series inductor in the controller to limit ripple current resulting from the high-frequency power switching therein. Presently available material for the rotor magnets, such as ceramic, powder ceramic in a plastic matrix, and samarium-cobalt, best meet these criteria. Ceramic and powered ceramic in a plastic matrix are presently preferable for most applications, on the basis of their low cost and practical requirement of magnetizing flux densities of about 10 kilogauss.

The rotor disks and end-disks are fastened together thru a shaft, which rotates at speed $\dot{\theta}_r = \dot{\theta}/6$ where $\dot{\theta} = d\theta/dt$ is the electrical rotational frequency of a 12-pole motor.

With the 2-phase stator windings each conducting essentially sinusoidal current, the resulting stator field is always an optimum 90° electrical, equivalent to 15° mechanical, from the rotor field. Insofar as deviations from this 90° optimum torque angle are minimal, the rotor is not subjected to appreciable alternating magnetic fields, so its losses therefrom are virtually zero. The relatively small high-frequency current ripple in the stator windings does not cause the rotor magnets to incur significant hysteresis or eddy current power losses, since they have low permeability and very high resistivity. Aluminum rotor parts incur eddy currents, but resulting losses are negligible because the resistivity is very low. In general, material with very high resistivity does not incur significant eddy currents so eddy losses are negligible, and material with very low resistivity may conduct eddy currents but does not incur significant I²R loss therefrom.

At a rotor speed of 6000 rpm, a 12-pole stator is subjected to an alternating field having a 600 Hz frequency. Since the stator conductors are embedded in a nonconductive matrix that is not ferromagnetic, it does not thereby incur eddy or hysteresis core loss; with the magnetic field pattern essentially confined between the rotor disks and end-disks, stray losses are minimal; and inasmuch as the copper conductors have a small axial cross-section (area intercepting the axial magnetic field), each is thus disposed such that eddy currents therein from the 600 Hz field are minimal, and since resistivity therein is very low, eddy loss in the windings is negligible. Therefore, a preferred motor embodiment has multiple-turn stator windings of small cross-section magnet wire, preferably rectangular (which facilitates 25% more copper volume over round magnet wire), connected preferably in series eith the windings of consecutively stacked stator rings. If a lower stator voltage is mandatory, requiring stator rings to be connected in parallel, each parallel ring should have in situ emf, as well as resistance and inductance, matching that of each other, to avoid power loss from current circulating between parallel rings due to emf mismatch and unequal current sharing due to combined mismatch.

Figure 2:
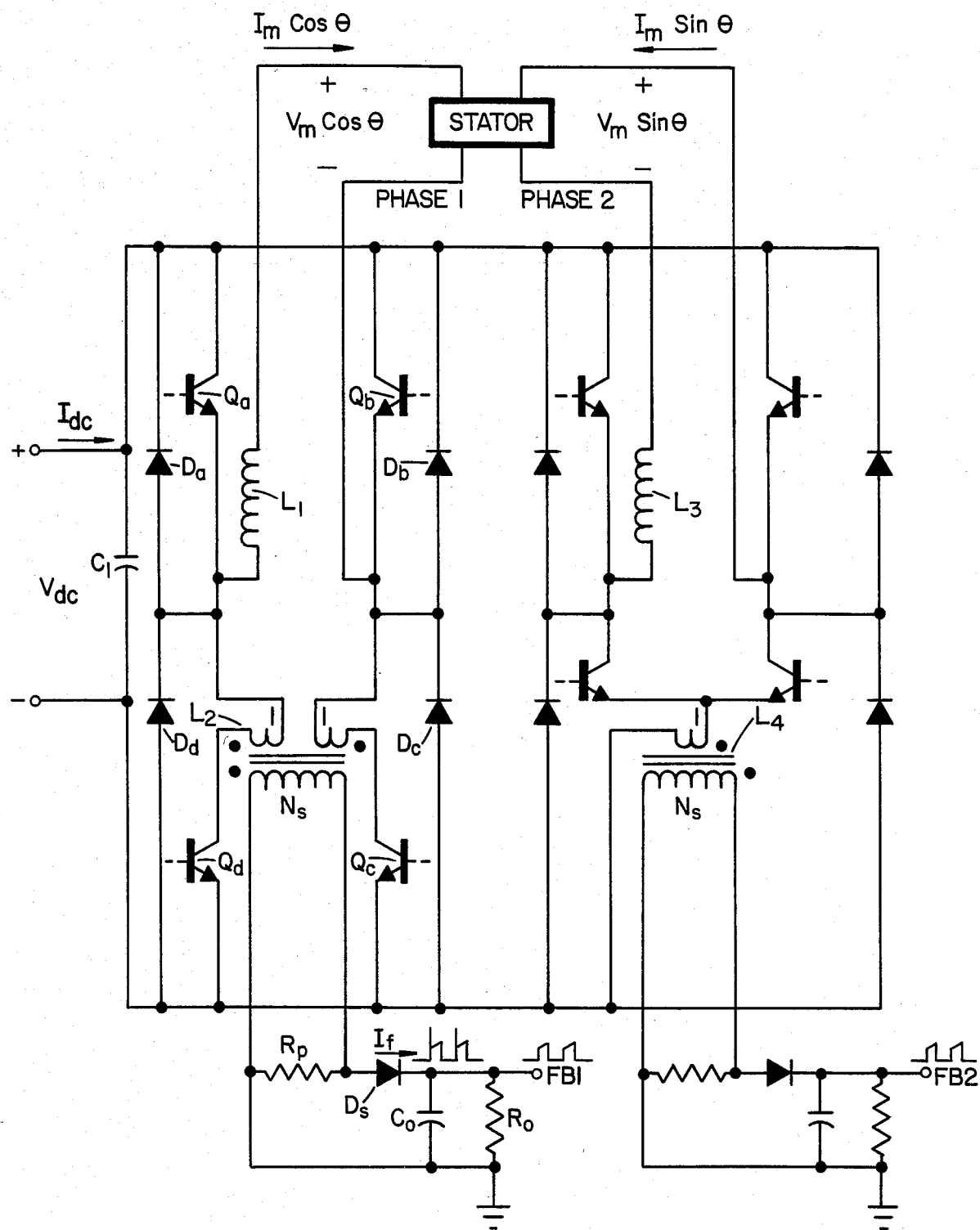
FIG. 2 shows a simplified schematic of a 2-phase high-frequency power switching circuit and the associated transistor current sensors.

High-frequency power switching and current sensors group 2, which effects controlled alternating current in the stator windings, is illustrated by the simplified schematic in FIG. 2; which shows two transistor and diode bridge circuits, one for each stator phase, with power filter capacitor $C_1$ across their dc nodes and power inductor $L_1$ in series with a stator winding across their ac nodes. In the power switching circuit of phase 1, on/off time ratio $T_{on}/T_{off}$ of a pair of selected power transistors (e.g., $Q_a$ and $Q_c$, $Q_b$ and $Q_d$, or $Q_c$ and $Q_d$) is controlled to effect desired current $I_m \cos \theta$. A like circuit associated with phase 2 effects $I_m \sin \theta$. These circuits are shown differing in FIG. 2 so interconnection of the two phases, with variations of the primary windings of the current sensor transformers, can be presented in one concise drawing; however, these circuits in a particular controller do not differ, and the transformer having the single primary winding is generally preferred for both phases.

For typical servomechanisms with regenerative reversing capability, pair $Q_a$ and $Q_c$ is switched on for $T_{on}$ and off for $T_{off}$ simultaneously to drive current $I_m \cos \theta$ thru the stator winding when $I_m \cos \theta$ and $V_m \cos \theta$ have polarities as indicated. Free-wheeling diodes $D_b$ and $D_d$ provide an alternate path for the current during interval $T_{off}$. Pair $Q_b$ and $Q_d$ are likewise switched to drive $I_m \cos \theta$ opposite the polarity shown. Diodes $D_a$ and $D_c$ then provide an alternate current path during $T_{off}$.

Series power inductor $L_1$ limits switching ripple current to $$I_{pp} = V_{L(on)} T_{on}/L_1 = V_{L(off)} T_{off}/L_1$$

where $V_{L(on)}$ and $V_{L(off)}$ are voltage across $L_1$ (microhenries) during $T_{on}$ and $T_{off}$ (microseconds) respectively, and $I_{pp}$ (amperes) is the resulting peak-to-peak ripple current.

Typically, high-frequency ripple current thru the stator winding is thus limited to a relatively small triangular waveform ripple, so $$V_m \cos\theta = \frac{T_{on} - T_{off}}{T_{on} + T_{off}} V_{dc}$$

where $V_m \cos \theta$ is the stator emf (volts) and $V_{dc}$ is the dc supply voltage.

When $I_m \cos \theta$ and $V_m \cos \theta$ have polarities as indicated, $T_{on}$ is longer than $T_{off}$ (i.e., when driving the motor in the same direction it is rotating). And $T_{on}$ approximates $T_{off}$ when $V_m \cos \theta$ approximates zero (i.e., momentarily during zero-crossings and continuously if the rotor is locked). Also, when $I_m \cos \theta$ is as shown and $V_m \cos \theta$ has opposite polarity, $T_{on}$ is shorter than $T_{off}$ (i.e., when driving the motor opposite its direction of rotation).

A high-frequency pulse current thru capacitor $C_1$, due to switching $Q_a$ and $Q_c$ simultaneously, with $D_b$ and $D_d$ providing an alternate current path, approximates a variably asymmetric squarewave at the switching frequency $$f_s = 1/(T_{on} + T_{off})$$

with a peak-to-peak amplitude that approximates $2I_m \cos \theta$. A similar staggered pulse current from phase 2 is superimposed thereupon having a peak-to-peak amplitude $2I_m \sin \theta$.

In the preferred embodiment, $C_1$ is constituted by large aluminum electrolytic capacitors. With $C_1$ absorbing almost all of the high-frequency component of current, the phase 1 current envelope is $$I_1 = \frac{T_{on} - T_{off}}{T_{on} + T_{off}} I_m \cos\theta$$

which draws current and power when $I_m \cos \theta$ and $V_m \cos \theta$ polarities are as shown. Conversely, $I_1$ is negative when either $I_m \cos \theta$ or $V_m \cos \theta$ is reversed. Likewise, the phase 2 current envelope is $$I_2 = \frac{T_{on} - T_{off}}{T_{on} + T_{off}} I_m \sin\theta$$

with like relative polarity.

For certain applications that warrant the complexity of adaptive switching logic, or that do not require reversing the direction of rotation, an alternative drive switching schedule can increase full-load controller efficiency about ¼% and increase efficiency at light loads somewhat more, and can decrease $C_1$, $L_1$, and $L_3$ about 50%: $Q_c$ is switched on and off while $Q_a$ is held on, when $I_m \cos \theta$ and $V_m \cos \theta$ have the polarities indicated; and $Q_d$ is switched on and off while $Q_b$ is held on, when $I_m \cos \theta$ and $V_m \cos \theta$ polarities reverse. Compared to the first switching schedule described hereinabove, it results in about half the ripple voltage across $L_1$ and $L_3$ as well as half the ripple current thru $C_1$. Whenever either stator current exceeds its commanded level by a predetermined amount, adaptive switching control presents a binary signal to the switching logic, that causes it to effect a regenerative braking schedule, wherein $Q_c$ and $Q_d$ are simultaneously switched on and off in accordance with a dictated duty-cycle. Then whenever the stator currents are less than their commanded levels by a predetermined amount and no brake command is being executed, switching logic reverts to the alternative schedule for providing drive current, wherein $$V_m \cos\theta = \frac{T_{on}}{T_{on} + T_{off}} V_{dc}$$

and $$I_1 = \frac{T_{on}}{T_{on} + T_{off}} I_m \cos\theta$$

where $T_{on}$ ranges from zero tp nearly $T_{on} + T_{off}$ for $V_m \cos \theta$ ranging from zero to nearly $V_{dc}$. Since practical components require as long as 1 microsecond to effect transistor turn-off, $T_{on}$ has a like minimum duration; so a practical circuit for achieving $T_{on} = 0$ requires an additional current sensor for each phase, each having a current transformer with its primary winding in series with the free-wheeling diodes; whereby current feedback pulses therefrom are presented to comparator means also responsive to the respective synchronized amplitude control signal; whereby said comparator means inhibit pulse initiation when the free-wheeling diode current feedback pulses exceed the respective synchronized amplitude control signal.

Irrespective of the schedule by which the power switching transistors are selected to effect drive current, regenerative braking is controlled by switching transistor pair $Q_c$ and $Q_d$ on and off simultaneously, so $$V_m \cos\theta = \frac{T_{off}}{T_{on} + T_{off}} V_{dc}$$

and $$I_1 = \frac{-T_{off}}{T_{on} + T_{off}} I_m \cos\theta$$

It can be readily shown, by combining the above equations, that current exchanged with the dc power source and sink is $$I_{dc} = I_1 + I_2 = (I_m V_m / V_{dc}) \sin^2 \theta + (I_m V_m / V_{dc}) \cos^2 \theta = I_m V_m / V_{dc}$$

for each of the three switching logic schedules described above. It can thus be readily appreciated that $I_{dc}$ is practically free of high-frequency components, due to filtering by $C_1$, and is practically free of the large variations in $I_1$ and $I_2$ that accompany rotation, due to cancellation of their complementary sinusoidal components as $I_1$ and $I_2$ are thereby combined.

As indicated by the above equations: $I_{dc}$ is positive and power is used to drive the motor; $I_{dc}$ is negative and power is regenerated to decelerate or brake.

By staggering the times at which pulsing is initiated, $T_{on}$ is caused to recur alternately in the power switching for phase 1 and phase 2, so their respective high-frequency current pulses are staggered at $C_1$. This results in nominally half the rams ripple current thru $C_1$, at double the frequency, compared to the ripple that would nominally result if pulses were not staggered. So power loss in $C_1$ and switching ripple voltage across $C_1$ are roughly one-fourth the non-staggered counterpart.

Current is regulated in each of the stator windings by controlling turnoff times, and thereby controlling $T_{on}/T_{off}$ ratios, as dictated by comparator means responsive to the associated synchronized amplitude control signal and to each corresponding instantaneous current feedback pulse. In the current sensor illustrated by the circuit of phase 1, transistor current thru one of two single-turn primary windings of transformer $L_2$ is inductively coupled to a several-hundred-turn secondary winding $N_s$. Ratio $T_{on}/T_{off}$ is restricted to about 20, to 20, to facilitate practical re-zeroing of magnetizing current $I_\phi$ between each pulse so $I_\phi$ is limited to a negligible fraction of the sensed current. Transformer $L_2$ secondary current $$I_f = (I_m \cos \theta + I_{rr} - I_\phi)/N_s$$

is fed to capacitor $C_o$ and resistor $R_o$ thru series diode $D_s$, which blocks a reverse voltage during $T_{off}$ that can be about 40 times the forward voltage during $T_{on}$, depending on the properties of the parallel resistive element $R_p$, which preferably has a non-linear positive resistance that decreases as current increases.

The current spike at the leading edge of each current pulse is due to the reverse recovery current $I_{rr}$ of $D_a$ and $D_b$. Since the reverse charge of the diodes $I_{rr}t_{rr}$ is relatively small and is roughly proportional to forward conduction current, $C_o$ can absorb charge $I_{rr}t_{rr}/N_s$ without significantly delaying the main part of the feedback pulses $$FB1 = R_o I_m \cos \theta / N_s.$$

The current sensor of phase 2 provides current feedback pulses inductively coupled by transformer $L_4$ which has one single-turn primary winding. Its secondary winding and pulse conditioning circuit are the same as that of phase 1, and feedback pulses $$FB2 = R_o I_m \sin \theta / N_2$$

are provided by the same circuit action.

Power inductors $L_1$ and $L_3$ are each preferably constituted by very low resistance windings potted in thermally conductive epoxy between ferrite cores having gapped centers to linearize inductance and ungapped surrounding ferrite that closes the magnetic path therefor to minimize electromagnetic radiation from the inductors. Ferrite core losses can be practically zero and copper losses low compared to the power transistor and free-wheeling diode losses. Current transformers $L_2$ and $L_4$ preferably also have ferrite cores, with gapped centers to accommodate single-ended drive and ungapped surrounding ferrite that closes the magnetic path therefor to minimize crosstalk and electromagnetic susceptibility.

A sample efficiency calculation of a representative switching controller operating at rated power, with $I_m = 10$ amperes at $V_m = 230$ volts and $V_{dc} = 240$ volts is presented next, by way of an example which identifies and accounts for each significant component of controller power loss:

While driving the motor, the controller output is $$P_e = I_m V_m = (10)(230) = 2300 \text{ watts.}$$

Dissipation in power filter capacitor $C_1$, having an equivalent series resistance of roughly 0.01 ohm, and high-frequency squarewave current from both phases of roughly 10 amp. rms, is about $(10)^2(0.01)$ which amounts to about 1 watt.

Quiescent power for all the controller electronics is typically about 0.5 watt.

While conducting at current $I_{on}$, transistor loss is mainly due to on-voltage $V_{ce}$ across its collector and emitter; so instantaneous power loss from two transistors conducting in series is $2I_{on}V_{ce}$. For representative Darlington-connected power transistors, $V_{ce}$ is typically under 2 volts. With an average current of 6 amperes per phase and 82% duty-cycle, average conduction loss of the two series transistors is then $2(0.82)(6)(2)$ which amounts to about 20 watts per phase.

Transistor turn-on transitions cause power dissipation in two transistors switching in accordance with the first described schedule, but only one transistor switching in accordance with the alternative and braking schedules. This loss is mainly due to reverse current $I_{rr}$ and recovery time $t_{rr}$ of the free-wheeling diodes which are then turning off, and amounts to $I_{rr}t_{rr}V_{dc}f_s$ in each transistor, where $V_{dc}$ is the dc power voltage and $f_s$ is the switching rate. Estimating for this example that average $I_{rr}t_{rr}$ is 0.6 amp-microsecond, $V_{dc}$ is 240 volts, and $f_s$ is 0.05 MHz, turn-on losses are then about $(0.6)(240)(0.05)$ amounting to about 7 watts per transistor in each phase.

Transistor turn-off transitions cause power dissipation in the two transistors which are turning off that approximates $0.2I_{on}t_fV_{dc}f_s$ where $I_{on}$ is 6 amperes, and (with active base pull-down) turn-off transition time $t_f$ is 0.1 microsecond. Turn-off losses are then $(0.2)(6)(0.1)(240)(0.05)$ amounting to about 2 watts per phase.

Base drive and pull-down averaging 0.1 ampere from 4 volt supplies for a power transistor pair $(2)(0.1)(4)$ amounts to about 1 watt per phase.

Diode forward conduction voltage is typically 1 volt while conducting 6 amperes average at an average duty-cycle of about 18%; so diode dissipation per phase with two diodes conducting in series is about $(2)(0.18)(1)(6)$ amounting to about 2 watts.

Power inductor losses are essentially $I_m^2 R_i$ for both phases combined, where $R_i$ is the winding resistance of each inductor and is about 0.1 ohm; so the combined inductor losses are about $(10)^2(0.1)$ amounting to about 10 watts.

For providing rated drive power, with the first described switching schedule, total dissipation in the controller is then approximately $1.0 + 0.5 + 2(20 + 2 \times 7 + 2 + 1 + 2) + 10$ which amounts to about 90 watts.

So controller efficiency is $(2400 - 90)/2400 = 0.96 = 96\%$ while driving at full speed and load, with the first described switching schedule.

With the alternative switching schedule; the power filter capacitor is subjected to lower ripple current, causing about 0.5 watt dissipation; quiescent power remains 0.5 watt; transistor duty-cycle is 64%, resulting in about 12 watts dissipation in one pair and 8 watts in another, with total transistor conduction loss remaining 20 watts per phase; turn-on losses remain about 7 watts per transistor (but for only 50% of the time); turn-off losses remain about 2 watts per phase (practically all sustained by the transistors with variable duty-cycle); base drive power remains about 1 watt per phase; the free-wheeling diodes, with still an 18% effective duty-cycle, still dissipate about 2 watts per phase; and power inductor losses remain about 10 watts. So total controller dissipation is then $0.5 + 0.5 + 2(20 + 7 + 2 + 1 + 2) + 10$ which amounts to about 75 watts; and drive efficiency is above 96%.

Although, if the rotor is stalled, dissipation is not shared equally by the eight power switching transistors in the controller, nor by the eight free-wheeling diodes, the transistors each dissipate practically equal average power as it rotates, and losses in each of the diodes are shared equally.

With the switching schedule for braking, transistor duty-cycle (one at a time) is 36%, so transistor conduction losses are about 4.5 watts per phase, and average diode duty-cycle is 82%, so diode losses are about 10 watts per phase. Total power loss in the controller then is $0.5+0.5+2(4.5+7+2+1+10)+10$ which amounts to about 60 watts; so controller braking efficiency is about $(2300-60)/2300=97\%$ at full speed and torque.

In systems that provide a large bulkhead having ample flat mounting surface for effective conductive heat transfer therethru, the controller components that dissipate significant power can be mounted to passively conductive heat sinks therein. When such a mounting surface is not available, active cooling such as forced-air convection is generally required, which may add about 25 watts to the total power in the above example.

For a representative motor compatible with the above controller example, calculations are presented below of axial forces between the magnets, torque between the magnets and the stator windings, and at a rotor speed of 6000 rpm, shaft power, stator emf, electrical and mechanical power losses, and efficiency:

Magnetic forces between rotor disks are relevant mainly to mechanical design, assembly, and disassembly of the motor. The axial field pattern between the disks and end-disks can be expressed in terms of the axial flux density $$B = B_m \sin\theta$$

where $B_m$ is the maximum flux density (gauss). Axial magnetic attraction (pounds) between one rotor disk and the next coaxial rotor disk or end-disk is $$F_a = 29 \times 10^{-8} A_m B_m^2$$

where $A_m$ is the magnet area (square inches) normal to the axis, including fringing. Disks and end-disks, each having a permanent-magnet ring with a 3 inch outer radius $r_o$ and 1.5 inch inner radius $r_i$ so $A_m = 21$ sq. in., and with $B_m = 2000$ gauss, would exert a total approximate mutual force $F_a = 25$ pounds between their magnets.

Torque (inch pounds) from one stator phase, contributed by a single radial conductor segment between respective outer and inner arcs of radius $r_o$ and $r_i$ (inches), each conducting current $I_m \cos\theta$ (amperes) in said axial rotor field, is $$T_c = 29 \times 10^{-8} B_m (r_o^2 - r_i^2) I_m \cos^2\theta$$

and from the other phase is $$T_s = 29 \times 10^{-8} B_m (r_o^2 - r_i^2) I_m \sin^2\theta$$

where rotor torque is exerted on the magnets and stator torque on the radial conductor segments. So a 2-phase motor having $N_{rc}$ radial conductor segments per phase will exert a total instantaneous torque (inch-pounds)

$$T_{rs} = 29 \times 10^{-8} N_{rc} B_m (r_o^2 - r_i^2) I_m$$

between its rotor and stator. Thus a 2-phase 12-pole motor, having a stator with 12 turns per phase and 5 full windings plus one that has 10/12 the number of radial conductor segments, will have $N_{rc} = 840$ total; which with $B_m = 2000$ gauss, $r_o = 3$ inches, $r_i = 1.5$ inches, and $I_m = 10$ amperes, will exert motor torque $T_{rs} = 33$ inch-pounds.

Rotor shaft power (horsepower) is $$P_m = 9.5 \times 10^{-4} T_{rs} \dot\theta_r$$

where $\dot\theta_r = 100$ revolutions per second at 6000 rpm, which at $T_{rs} = 33$ inch-pounds, results in $P_m = 3.13$ horsepower.

A sinusoidal emf (volts) induced across each radial conductor segment of one phase is $$V_c = 1.55 \times 10^{-9} A_m B_m \dot\theta_R \cos\theta$$

and across each like segment of the other phase is $$V_s = 1.55 \times 10^{-9} A_m B_m \dot\theta_r \sin\theta$$

where again, $A_m$ is magnet area (sq. in.), $B_m$ is flux density (gauss), and $\dot\theta_r$ is rotor speed (revolutions per second).

Total emf across the stator winding terminals is respectively $$N_{rc} v_c = V_m \cos\theta$$

and $$N_{rc} v_s = V_m \sin\theta$$

so with $N_{rc} = 840$, $A_m = 21$ sq. in., $B_m = 2000$ gauss, and $\dot\theta_r = 100$ rev./sec., it is readily calculated that $V_m = 230$ volts.

Electric power (watts) for both phases combined is $$P_e = V_m I_m$$

which, at $V_m = 230$ volts and $I_m = 10$ amperes, results in $P_e = 2300$ watts.

Since motor losses are not considered in the above calculations, the electrical and mechanical power is equivalent and related by the expression $$P_e = (746 \text{ watts/horsepower}) P_m.$$

Total motor dissipation (watts) at full power is essentially $$P_d = I_m^2 R_c + P_f$$

where $R_c$ is stator resistance (ohms) per phase and $P_f$ represents combined friction and windage. In the representative motor, stator conductors would be formed from #14 AWG magnet wire, preferably rectangular, having a total length of about 200 feet per phase and resistance $R_c = 0.55$ ohm per phase, so total electrical motor loss is 55 watts at $I_m = 10$ amperes. At 6000 rpm, $P_f$ is typically about 15 watts. Motor efficiency is then $1 - P_d/P_e$ which is about $1 - 70/2300 = 97\%$ at 6000 rpm and 2300 watts.

Figure 3:
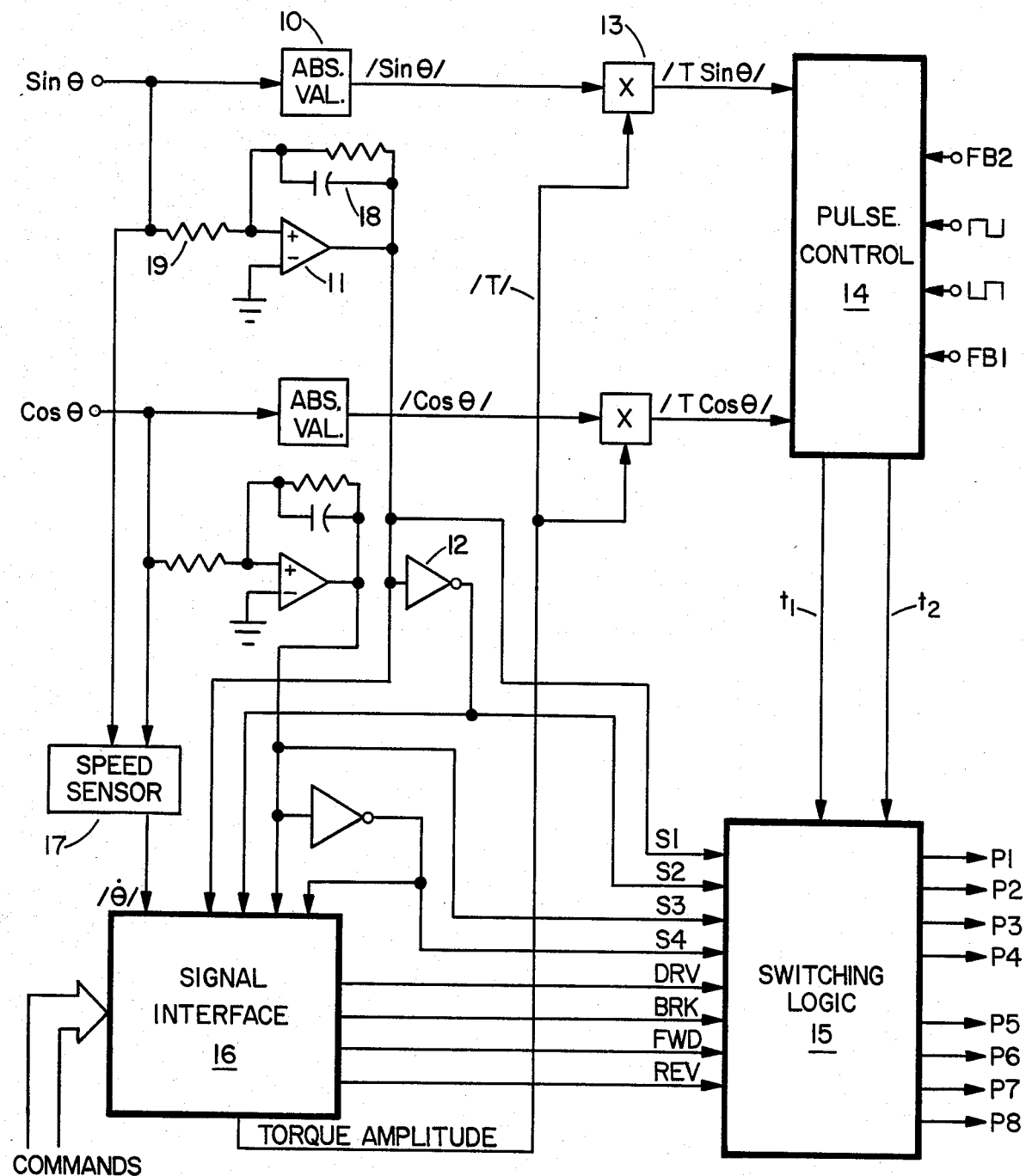
FIG. 3 shows a functional schematic of the signal processors, pulse control means, and switching logic.

Signal processors and switching logic group 1 is next described by way of reference to FIG. 3, which shows its functional elements with interconnection therebetween and to other elements of the servomechanism.

Transducer signal $\sin\theta$ is presented to absolute value circuit 10, which derives therefrom instantaneous magnitude $/\sin\theta/$. Thru input resistor 19, cooperative with positive feedback neetwork 18, which includes a resistor to provide a relatively small amount of signal hysteresis and a capacitor to speed switching transitions and limit switching rate, known comparator 11 provides unambiguous polarity of $\sin\theta$ designated S1. Known logic inverter 12 provides therefrom polarity signals S2 which is $\overline{S1}$. Transducer signal $\cos\theta$ is processed by like means to provide therefrom instantaneous magnitude $/\cos\theta/$ and polarity signals S3 and S4 which is $\overline{S3}$.

Speed sensor 17 derives from $\sin \theta$ and $\cos \theta$ a continuous lagless speed feedback signal $/\dot\theta/$ proportional to the instantaneous frequency thereof and thus to the instantaneous rotor speed. It is described hereinafter.

Signal interface 16 is variously configured for providing signals to perform various specific control functions. A configuration for controlling speed with analog speed feedback, another for ultra-precise speed with digital error integration and correction, another for ultra-precise speed proportional to a pulse rate with error correction and interpolated input and feedback, another for digitally commanded position, another for variable-rate pulse-incremented position, another with digital readouts for self-programming and motor jogging control to effect desired positioning, another for digitally commanded position with interpolated position feedback, another with interpolated pulse-incremented input and interpolated position feedback, and yet another for flywheel power storage, are described hereinafter. Its diverse configurations each receive input commands, which are variously processed with $/\dot\theta/$ and S1 thru S4, to provide therefrom torque amplitude signal $/T/$, and variously, drive, brake, forward, and reverse commands, according to the particular control function desired.

Instantaneous magnitudes $/\sin \theta/$ and $/\cos \theta/$ are respectively mutiplied by torque amplitude $/T/$ to provide respective synchronized amplitue control signals $/T \sin \theta/$ and $/T \cos \theta/$. Multiplier means 13 is economically implemented by CMOS switches that are switched on and off at time ratios which vary with $/T/$; and where higher frequency response is required, by known analog multipliers.

Pulse control means 14 initiates time-staggered pulses from transitions of a bi-phase 50 KHz squarewave presented thereto. Pulses are typically initiated by setting respective even and odd bistable means from known digital delay circuits after approximate 1 microsecond delays from respective even and odd squarewave transitions. The bistable associated with phase 1 is reset by a first comparator which determines when the instantaneous amplitude of associated current feedback pulse FB1 overtakes synchronized amplitude control signal $/T \cos \theta/$, and likewise, the bistable associated with phase 2 is reset when FB2 overtakes $/T \sin \theta/$. To restrict duty-cycle, whenever a feedback pulse does not overtake the associated synchronized amplitude control signal, an even bistable is reset by the next even squarewave transition, and an odd bistable by the next odd transition. Each bistable is set again after 1 microsecond respective delays, according to cycles that repeat every 20 microseconds. So the maximum duty-cycle is 19/20 or 95% for this example. Restricted duty-cycle is necessary for practical re-zeroing of magnetizing current in the current sensor transformers. It also facilitates transformer-coupled drive to the power switching transistors. The pulse control means are preferably constituted by well known integrated circuit comparators and CMOS integrated logic.

Switching logic 15 receives polarity signals S1 thru S4, various binary commands, and the staggered pulses with dictated duty-cycle on lines $t_1$ and $t_2$ for respective phases 1 and 2; and provides therefrom control pulses on lines P1 thru P8 for selecting and controlling duty-cycle of the eight power switching transistors, in accordance with the schedules described hereinabove. It is preferably constituted by well known CMOS integrated logic.

Figure 4:
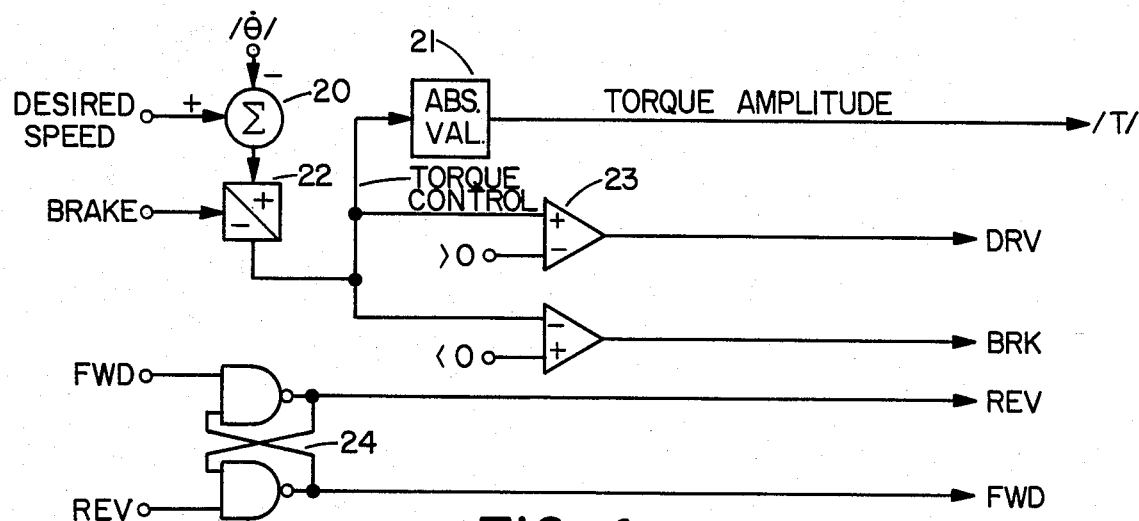
FIG. 4 shows a functional schematic of signal interface means for providing signals to regeneratively control bidirectional rotor speed in compliance with commanded analog speed and brake signals and binary direction commands.

Signal interface means are illustrated in FIG. 4 that provide control signals for bidirectional regenerative speed control responsive to a variable analog speed command, a braking signal, and binary direction commands. The speed command, proportional to desired speed, is compared with speed feedback $/\dot\theta/$ by analog combiner means 20 to provide a speed error signal. A negative analog braking signal which varies according to desired braking effort can override the speed error by symbolic override combiner means 22 that provides a torque control signal. Combiner 20 is generally linear, causing drive torque proportional to desired minus actual speed and proportional braking torque when the desired speed exceeds the actual. The override does not affect the torque control signal thereby dictated when the braking signal is between zero and a prescribed threshold, beyond which the torque control signal is dictated by the more negative input to the override, tracking the signal which results in the greater braking torque.

A preferred embodiment of the override is constituted by two op-amps whose outputs each have only pull-down capability, each connected to a common pull-up resistor, one op-amp tracking the speed error and the other tracking the negative braking signal.

Comparator 23 produces a binary drive command when the torque control signal is positive and exceeds a prescribed threshold. A like comparator produces a binary brake command when the signal is negative beyond a prescribed threshold. In applications requiring a zero threshold, a single comparator with a zero reference input provides one binary command, and a logic inverter provides therefrom the other binary command. Known means for briefly delaying the leading edge of the binary commands may be included that insures a separation therebetween of several microseconds.

Forward and reverse desired direction commands are interlocked by mutually exclusive logic means such as nand latch 24 so only one unambiguous direction command is presented to the switching logic, despite possibly conflicting input commands. Whereas the nand latch operates with negative polarity logic, an analogous nor latch is required with positive. Leading edge delays may also be included.

Figure 5:
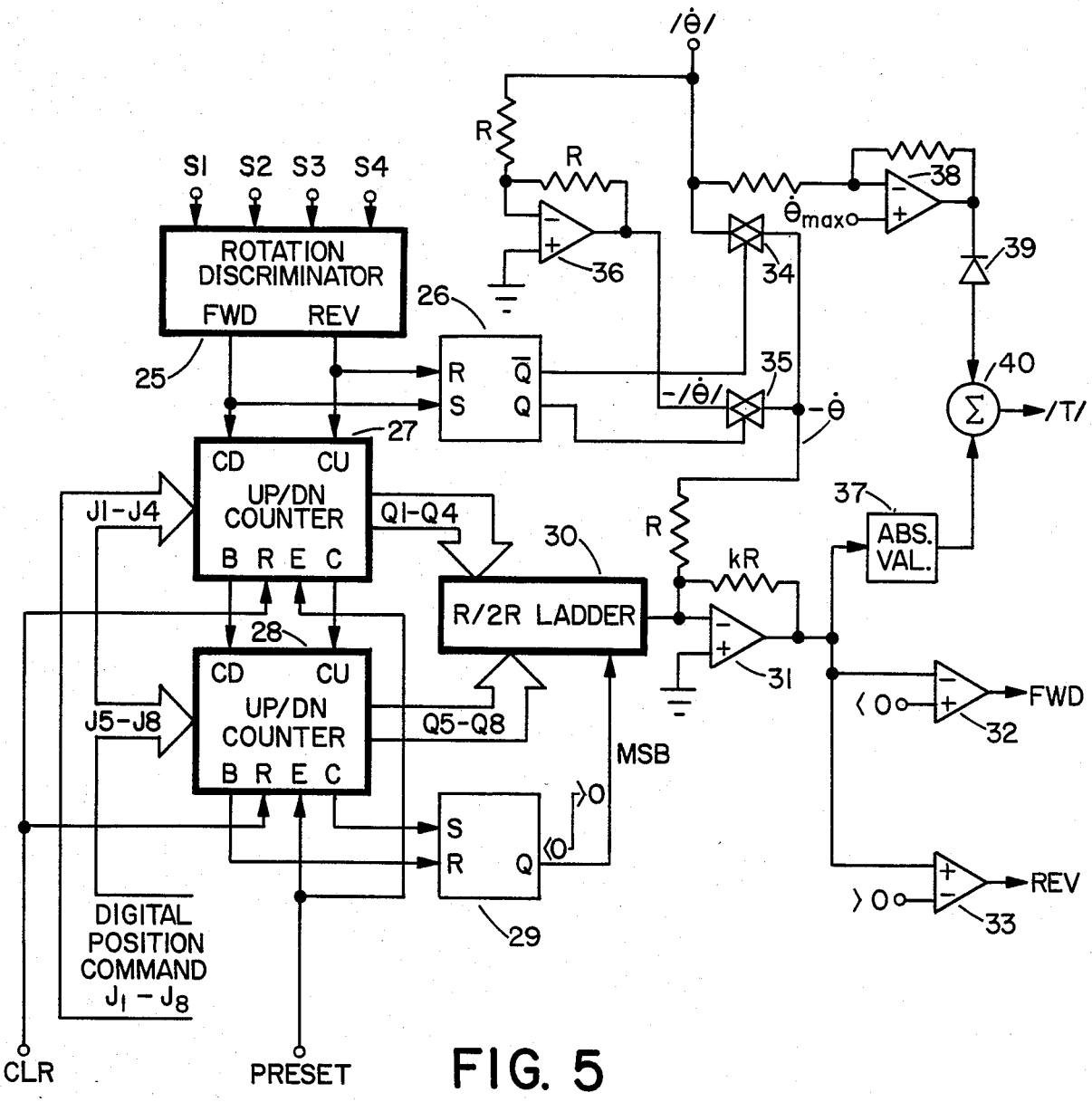
FIG. 5 shows a functional schematic of signal interface means for providing signals to regeneratively control position in compliance with digital position commands.

Signal interface means responsive to digital position commands are illustrated in FIG. 5 which provide forward and reverse binary commands and torque amplitude $/T/$.

Rotation discriminator 25, responsive to polarity signals S1 thru S4, provides a pulse from its FWD output line at each forward rotation transition of S1 thru S4, and a pulse from its REV output at each reverse rotation transition. In a 2-phase 12-pole motor, S1 thru S4 have 24 transitions per revolution that occur at rotor angles 15° apart.

The rotation discriminator is preferably constituted by first and second 4-input or-gate means, responsive to respective first and second groups of four known monostable means. The monostables each have an enable input that enables pulse initiation when at a particular binary level, and an edge-triggered input that initiates a pulse on a transition if the monostable is enabled. The edge-triggered inputs of the first group are connected to lines carrying S1, S2, S3, and S4, respectively; and their respective enable inputs to lines carrying S4, S3, S1, and S2, to enable triggering on odd transitions which occur only with forward rotation. The edge-triggered inputs of the second group are likewise connected to S1, S2, S3, and S4, respectively; and their respective enable inputs to S3, S4, S2, and S1, to enable triggering on even transitions which occur only with reverse rotation. The first or-gate outputs a pulse, which presented a pulse by one of the monostables in the first group, for every forward rotation transition (24 pulses per revolution, in this example); and the second or-gate likewise outputs a pulse for every reverse rotation transition. The difference between the number of forward and reverse rotation pulses, resulting from transitions due to dither or transducer signal noise, will always be essentially zero, because, with no net rotation, odd and even transitions occur alternately, causing alternate up and down counts with no net count accumulation.

Up/down counter 27 counts up (i.e., the binary number presented at output Q1 thru Q4 is incremented one count) on receipt of a pulse at its CU input from the REV output of rotation discriminator 25, and counts down on a pulse at its CD input from the FWD output of the rotation discriminator. Like counter 28 counts up on receipt of a carry pulse from output C of counter 27, and counts down on a borrow pulse from output B. It outputs a borrow pulse on counting down thru zero and a carry pulse when counting up to zero, that provide respective reset and set commands to bistable 29, whose output Q represents the polarity of the command counter output Q1 thru Q8. The digital output represented by the binary signals presented at Q1 thru Q4 together with Q5 thru Q8 and Q provide a 9-bit digital representation of position difference and direction, where Q1 is the least significant bit (LSB) and Q is the most significant bit (MSB), which are presented to digital-to-analog converter 30, whose output ranges between nominally $+5$ and $-5$ volts from a source resistance of value R presented by an integrated resistor network known as an R/2R ladder.

Any number of like counters can be thus cascaded to extend resolution as required. The counters and bistable are preset thru lines J1 thru J8 and thru input gates to the bistable which are not shown, enabled by a pulse on the PRESET line, at a reference position, to a digital command representing a desired travel amount and direction. The signal interface then provides drive commands and a torque amplitude signal that causes rotation, with feedback pulse counting, toward a count of zero, at which a null is reached and the position feedback loop is at equilibrium.

The rotation discriminator also provides FWD and REV pulses to respective set and reset inputs of bistable 26, which provides continuous binary signals indicating direction of rotation from its outputs Q and $\bar{Q}$ that are updated with each polarity transition.

Speed sensor 17 provides instantaneous speed magnitude signal $/\dot{\theta}/$, and rotation discriminator 25 with bistable 26 provide direction of rotation, to synthesize negative velocity feedback $-\dot{\theta}$ for bidirectional servo damping. With $/\dot{\theta}/$ presented at its input, unity-gain inverting amplifier 36 provides $-/\dot{\theta}/$ at its output. Analog switches 34 and 35, controlled by bistable 26, respectively present $/\dot{\theta}/$ during reverse rotation and $-/\dot{\theta}/$ during forward rotation, thus synthesizing negative velocity feedback having direction and magnitude.

The analog output of ladder 30, denoting the direction and distance (or rotation) which must be traveled to reach the digitally commanded position, is combined thru its output resistance with synthesized velocity feedback $-\dot{\theta}$ thru resistor R by op-amp 31 having a feedback resistor kR selected to obtain a loop gain for the servomechanism at which optimum dynamic response is achieved. The output of op-amp 31 is a torque control signal, which is compared to a prescribed negative threshold by comparator 32 to provide a binary forward drive command, and to a positive threshold by comparator 33 to provide a reverse drive command. In applications requiring a zero threshold, a single comparator with zero reference input provides one binary command, and a logic inverter presents therefrom the other binary command. Leading edge delays may also be included to insure an interval of several microseconds therebetween.

Absolute value means 37 derives from said torque control signal the instantaneous amplitude thereof. Op-amp 38 compares speed feedback $/\dot{\theta}/$ with the maximum desired speed $\dot{\theta}_{max}$ and, when $/\dot{\theta}/$ begins to exceed $\dot{\theta}_{max}$, thru symbolic diode 39 subtracts from said amplitude in symbolic signal combiner 40 so that $\dot{\theta}_{max}$ is not significantly exceeded, to provide torque amplitude signal $/T/$ that varies to achieve compliance with the maximum slewing speed thereby imposed and with the position error minus the velocity feedback near the desired destination.

A preferred circuit for implementing the functions performed by absolute value means 37, op-amp 38, diode 39, and combiner 40 is constituted by override means, whereby the op-amp providing absolute value, and the op-amp providing the amplified difference between the speed feedback and the maximum desired speed, each have outputs with only pull-down capability, connected to a common pull-up resistor, for providing torque amplitude signal $/T/$ thereat, which does not result in slewing speed beyond the desired maximum, and, within that constraint, drives the motor to an equilibrium position where the position error and speed are zero.

Speed is otherwise limited by the dc power voltage $V_{dc}$ beginning when $V_m$ reaches $V_{dc}$; but harmonic currents resulting from such an operating mode would increase motor and controller losses.

Mechanisms having several degrees of freedom, requiring coordinated control of several articulated rotational and rectilinear movements, can be actuated by several position control servomechanisms each driving to consecutive programmed destinations in compliance with coordinated analog, binary, and digital commands.

Programming therefor is facilitated by a self-programming mode; wherein the several articulated members are positioned to each desired destination, and digital readouts provided thereat recorded for presentation as sequential digital commands to return consecutively to the positions thereby programmed. The digital readouts are each obtained by initializing counter means to zero before leaving each position, rotating the rotor to a desired destination, and tallying a count indicating the direction and amount of travel to the desired destination.

For situations wherein self-programming by manual positioning of the mechanisms without motor drive to the desired destinations is convenient, the FWD and REV outputs of the rotation discriminator, to the CD and CU inputs of the up/down counter are interchanged, and drive commands inhibited, by switch and logic means. A count indicating the direction and amount of rotation is tallied and a digital readout is provided by counters 27 and 28 and bistable 29.

For situations wherein the position control for self-programming is more conveniently effected by driving the motors to each desired destination, variable-speed pulse-incremented motor jogging control means are provided; wherein variable command pulse rates are presented, in addition to the feedback pulses, thru known pulse combining means, to the CU input for effecting forward rotation and to the CD input for reverse. Other up/down counter means, constituted by like duplicates of counters 27 and 28 and bistable 29, are likewise connected to rotation discriminator 25, for providing digital readouts representing the direction and amount of travel from one destination to the next.

In applications where there is a possibility that counters may be subjected to input counts beyond their maximum unambiguous range, known end-of-range detection and indication are included.

Metered command pulses, presented at a variable rate thru pulse queuing means described hereinafter, effect both precise position control and variable bidirectional speed control; whereby a variable number of command pulses precisely dictates destinations and a variable rate at which said pulses are presented dictates speed from one destination to the next. To effect bidirectional rotation, the command pulses are presented thru two metered pulse channels, with pulses on one channel for effecting forward rotation and on the other for reverse.

Since it would generally be desirable to effect the various control functions with a minimum of different signal interface configurations, the interface shown in FIG. 5, with pulse queuing means, can also be used for zero-error speed control. However, the complexity of several circuits of the signal interface means can be reduced for dedicated speed control, because they include functions not needed therefor, and the output of comparator 33 changed from a reverse to a brake command for achieving slightly higher braking efficiency. For example: the rotation discriminator need not separate forward and reverse rotation transitions, bistable 26 can be omitted, along with combiner 40, switches 34 and 35, op-amps 36 and 38, and diode 39; with analog speed feedback $/\dot{\theta}/$ presented instead to op-amp 31 thru resistor R, and torque amplitude $/T/$ presented instead from absolute value means 37. Direction commands, if required, are then presented thru means such as those shown in FIG. 4 to effect bidirectional rotation. A number of different means and different configurations, that effect equivalent signal processing and equivalent logic, are possible.

Analog interpolation of the command and feedback pulse increments, also described hereinafter, provides linearly variable motor jogging control as well as pulse-incremented position and speed control with finer resolution and faster dynamic response.

Signal interface means for controlling flywheel power storage basically provide control signals for driving the rotor to store power and for braking the rotor to regenerate power, primarily in response to the dc power voltage. It includes a dc voltage reference; a differential amplifier for sensing the dc power voltage; op-amp means responsive to the differential amplifier output and to the reference, for providing an error signal proportional to the dc reference minus the sensed dc voltage, which serves as the torque control signal; a speed sensor such as that shown in FIG. 7 for providing a speed feedback signal; comparator means with signal hysteresis, responsive to the speed feedback and to the dc voltage reference, for providing a binary speed lockout that inhibits drive commands to insure that rotor speed does not exceed a prescribed maximum consistent with safe centrifugal forces; a comparator for providing a drive command when the torque control signal is positive beyond a prescribed threshold; another comparator for providing a brake command when the torque control signal is negative beyond a prescribed threshold; and absolute value means responsive to the torque control signal, for deriving its magnitude $/T/$, refered to herein as the torque amplitude signal.

Figure 6:
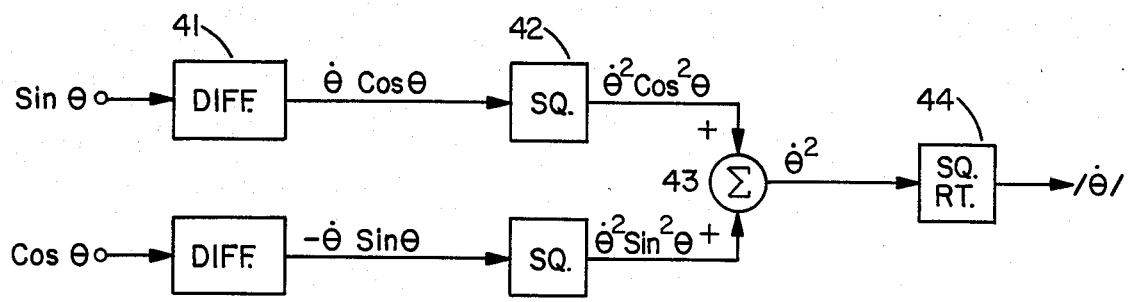
FIG. 6 shows a functional block diagram of a speed sensor for providing a ripple-free lagless speed feedback signal proportional to rotor speed.

Basic principles of an analog speed sensor for producing a continuous lagless speed feedback signal from idealized sinusoidal transducer signals $\sin \theta$ and $\cos \theta$ are illustrated in FIG. 6; which shows signal flow thru functionally identified elements. Time-derivatives of $\sin \theta$ and $\cos \theta$ are provided by differentiator means 41, which produce therefrom respective derivatives $\dot{\theta} \cos \theta$ and $-\dot{\theta} \sin \theta$, with instantaneous amplitude proportional to frequency $\dot{\theta}$. The derivatives are each squared by squaring means 42, which provide therefrom unipolar signals $\dot{\theta}^2 \cos^2 \theta$ and $\dot{\theta}^2 \sin^2 \theta$, that are added to each other by linear combiner means 43 wherein their complementary sinusoidal components cancel each other in accordance with a familiar trigonometric identity to produce $\dot{\theta}^2$, which is presented to square-root means 44, that derives therefrom the speed feedback signal $/\dot{\theta}/$.

Absolute value $/\dot{\theta}/$ is suitable for speed feedback in speed control servomechanisms even when bidirectional rotation is required. For bidirectional position control servo damping, $\dot{\theta}$ is synthesized therefrom as shown in FIG. 5 and described above. Since no conventional signal filtering to minimize ripple is needed, that would otherwise introduce considerable lag times, it is compatible with fast dynamic response.

Differentiator 41 and combiner 43 are preferably linear op-amp circuits known to those versed in the art. Squaring means 42 is preferably a known integrated analog multiplier. Square-root means 44 is a like device, differently configured.

Figure 7:
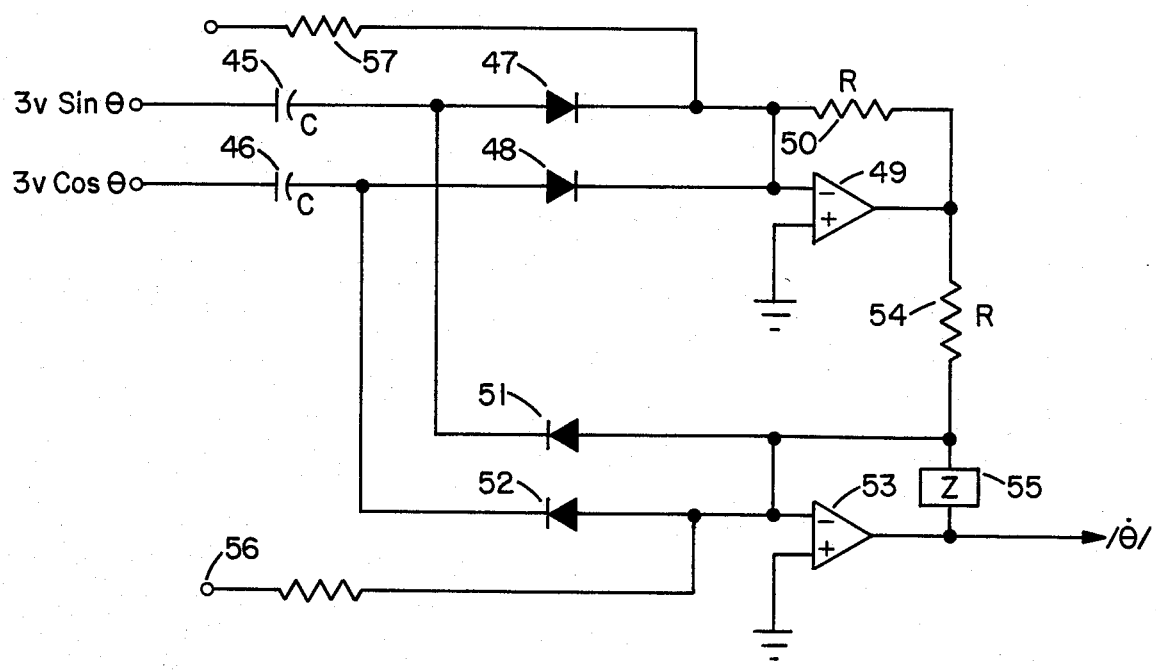
FIG. 7 shows a simplified schematic of a low-cost speed sensor for providing a low-ripple lageless speed feedback signal proportional to rotor speed.

FIG. 7 shows a low-cost analog speed sensor for providing continuous lagless speed feedback $/\dot{\theta}/$ with sufficiently low ripple for many applications without a ripple filter. Transducer signals which are typically 3 volts zero-to-peak are presented to capacitors 45 and 46, respectively; causing input current thru diodes 47 and 48 to op-amp 49, and thru diodes 51 and 52 to op-amp 53. The forward voltage vs. current of the diodes causes the current therefrom to approximate squared sinusoids as combined. The diode forward conduction voltage, typically varying logarithmically with diode current to about 0.5 volt, flattens the maxima and minima of the voltage waveform across each capacitor, so peak-to-peak capacitor voltage $E_{pp}$ is about 5.0 volts and the capacitor current waveform has practically zero slope near zero current (where the slope would be at a maximum if the diode conduction voltage were zero). The average rectified current thru each diode (microamperes) is $E_{pp} C \dot{\theta}$ where C is the capacitor value in microfarads and $\dot{\theta}$ is cycles per second. With feedback resistor 50 equal to input resistor 54, total average current to op-amp 53 thru diodes 51 and 52 and thru resistors 54 is $4 E_{pp} C \dot{\theta}$ and current ripple presented by each of the signal inputs to op-amp 53 substantially cancels one with the other so its output is practically free of ripple. Output voltage $/\dot{\theta}/$ from op-amp 53 with feedback impedance 55 (Z megohms) and no other input signals is $4 E_{pp} C Z \dot{\theta}$.

Inputs 56 and 57 afford means for using the low-cost speed sensor additionally as a signal combiner, which subtracts a signal presented at input 56 and adds a signal presented at input 57.

The speed sensors shown in FIG. 6 and FIG. 7 can be augmented for use with any number of phases. For example, transducers in a 3-phase motor provide signals sin θ, sin (θ−120°) and sin (θ−240°) for a speed sensor augmented therefor. Referring to FIG. 6, the third signal is likewise processed by a third differentiator, a third squaring means, and a third input to the combiner. Referring to FIG. 7, the third signal is likewise presented to a third like capacitor and, thru fifth and sixth like diodes, to respective op-amps 49 and 53.

Uncalibrated speed feedback /θ/ provided by the speed sensor in FIG. 6 has essentially the accuracy of the transducer signals presented to it, with no ripple except that due to distorted sinusoids and variation of magnetic field strength from one pole to the next. Typically, with the rotor magnets and Hall-effect transducers of the preferred motor embodiment, mean deviation is a few percent of the average signal amplitude at a particular speed. The speed sensor shown in FIG. 7 introduces additional error and ripple amounting to a few percent, so its resultant mean amplitude deviation and ripple are each several percent of the average signal.

An analog speed sensor, in combination with digital speed error integration and correction (which provide accumulated digital position error feedback as a correction signal), achieve zero speed error relative to a command pulse rate proportional to desired speed. An ultra-precise variable-speed command pulse rate can be provided by known crystal oscillator and digital frequency dividers with variable division control. Various other known means for supplying a variable pulse rate provide a time-base proportional to a resistance and capacitance product. Each type can also provide a sawtooth waveform interpolation signal with a slope interval between the pulses. An analog speed command can be derived from the pulse rate by various known frequency-to-voltage converters. However, a low-cost circuit for deriving the analog speed command from the slope interval of the command interpolation sawtooth waveform is described hereinafter which provides an analog speed command with higher bandwidth capability.

In FIG. 6 said analog speed command is summed with negative analog speed feedback by a second signal combiner. In FIG. 7 it is presented to input 56. The command pulse rate is presented, thru pulse queuing means, to up/down counter 27, which accumulates the difference between the command pulses and the feedback pulses from the rotation discriminator. Ladder 30 provides a position error signal which is equivalent to a digital speed error integration, for speed correction that provides zero steady-state error. Analog interpolations, of both the pulse-incremented input and position feedback, remove pulsations and facilitate faster dynamic response. The resulting speed correction signal is likewise combined with the analog speed command and the speed feedback.

For applications requiring a plurality of motors rotating in synchronism at a speed controlled by a common command pulse rate, a servomechanism motor can be advanced or retarded relative to the others by interjecting a discrete number of synchronizing pulses thru its pulse queuing means.

Analog interpolation, as described below, improves position control servomechanism dynamic response, virtually eliminates equilibrium dither, and can facilitate much finer positioning resolutions. For example, the transducer signals of a 2-phase 12-pole motor make 24 polarity transitions per rotor revolution that provide, without interpolation, stepwise position feedback that is by itself not updated between transitions. The time interval between transitions amounts to deadtime, and the digital incrementing amounts to small data jumps; which together can cause dither at equilibrium known as limit-cycling, with cyclic to-and-fro motion about an equilibrium zero-crossing of a transducer signal, at a nominal rotor angle that can be commanded in 15° least increments.

Position feedback interpolation provides continuous and substantially linear feedback, that practically eliminates deadtime between polarity transitions as well as the small data jumps thereat. Referring to FIG. 5, with analog position feedback interpolation, a sawtooth function of rotor angle whose peak-to-peak amplitude is equivalent to a digital increment from ladder 30, derived from the instantaneous magnitude of a transducer signal and polarity signals S1 thru S4, is summed with the output of ladder 30 by op-amp 31. Then, as the rotor angle varies, so does the practically linear sawtooth function thereof; and when the digital signal to ladder 30 increments or decrements, the sawtooth has a transition that counteracts the jump that would otherwise appear at the output of op-amp 31. With feedback interpolation, the optimum threshold provided by comparators 32 and 33 becomes zero; so respective forward and reverse commands would then preferably be provided by a comparator with zero reference, a logic inverter, and leading-edge delay means. These additions and variations to FIG. 5 effectively synthesize a linear negative-feedback servomechanism.

Figure 8:
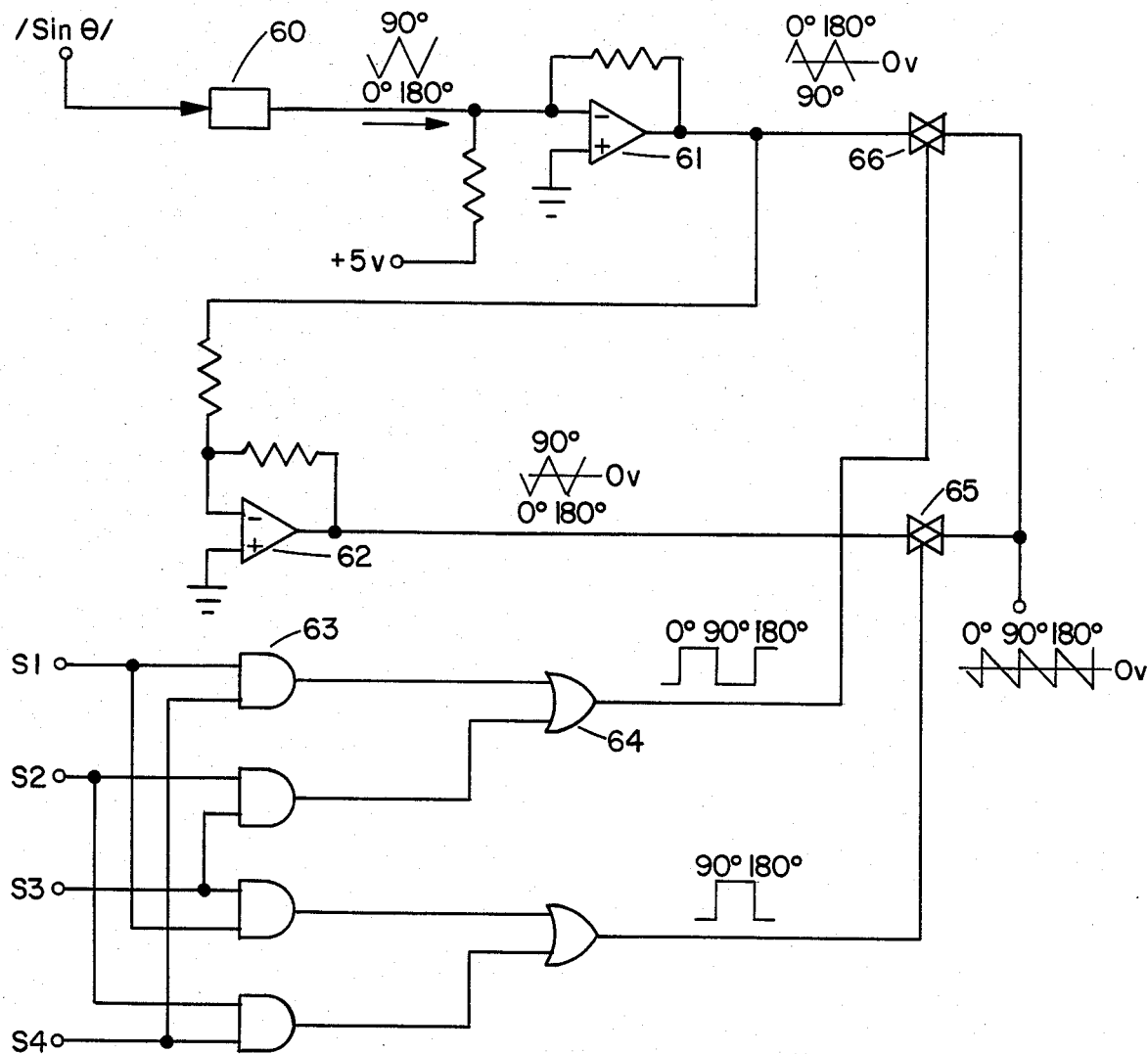
FIG. 8 shows a simplified schematic of a circuit for providing analog position feedback interpolation.

Analog position feedback interpolation means are preferably implemented by adding to the signal interface means shown in FIG. 5 the circuit shown in FIG. 8, wherein: Nonlinear compensation element 60, responsive to /sin θ/, provides a triangular function of θ approximating arcsin/sin θ/ over a 0° to 90° and 90° to 180° range, which ideally is linear with rotor angle, varying from zero at θ=0° to a maximum at θ=90°, back to zero at 180°, and repeating with rotation. Op-amp means 61 provides an output voltage responsive to the triangular function plus a dc bias, deriving a centered triangular function having approximately equal maxima and minima relative to zero reference. Inverting unity-gain amplifier 62, responsive thereto, provides a centered triangular function having the opposite polarity. And-gate means 63 and or-gate means 64 provide binary switch control signals in accordance with logic presented the polarity signals S1 thru S4 as shown in FIG. 8, to control analog switches 65 and 66, which provide from the centered triangular function a centered sawtooth function of rotor angle, that varies continuously with the angle between each polarity transition coinciding with each stepwise increment and decrement of ladder 30.

The analog position feedback interpolation shown in FIG. 8, in combination with command pulse interpolation, improves the dynamic response of servomechanisms with pulse-incremented motor jogging control, pulse-incremented position control with speed control between destinations, and speed commanded by a pulse rate.

Command pulse interpolation provides a sawtooth waveform with a slope interval that advances linearly between pulses, with coincident transitions thereat. It is scaled so peak-to-peak amplitude is equivalent to the digital increments of ladder 30 and is combined with the other signal inputs of op-amp 31, for effecting a continuous linearly advancing position command. The jumps due to stepwise incrementing in ladder 30 of the counted command pulses are thereby canceled by the command pulse interpolation sawtooth transitions. The polarity of the sawtooth waveform is reversed along with the channel presenting command pulses to counter 27 in accordance with the commanded direction of rotation.

Figure 9:
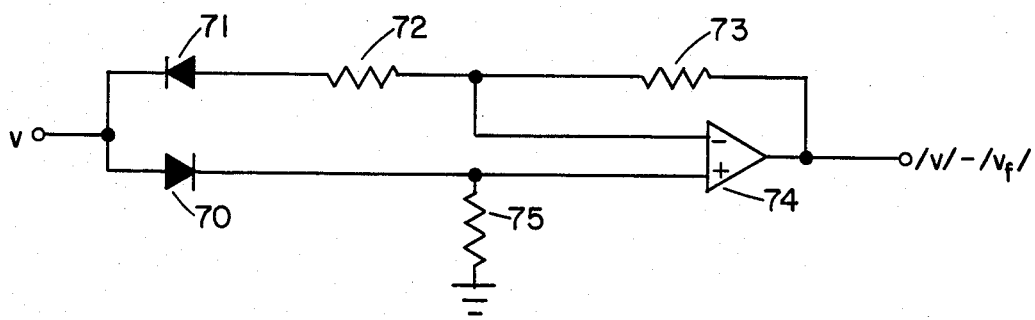
FIG. 9 shows a simplified schematic of a low-cost circuit for deriving the absolute value of its input signal.

FIG. 9 shows a preferred circuit for deriving an approximate absolute value $/v/-/v_f/$ of its input signal v, which is presented to the anode of diode 70 and to the cathode of diode 71. When signal v is negative, diode 71 conducts, and thru resistor 72 input signal current which causes an equal feedback current thru equivalent value negative feedback resistor 73 as dictated by op-amp 74, whose positive input is then biased thru resistor 75 to ground, so its output is then $-(v+v_f)$ where $v_f$ is diode forward conduction voltage. Since v is then negative, the output signal is $/v/-/v_f/$. When v is positive, diode 70 conducts, and diode 71 is reverse biased; so no current flows thru resistor 72, and therefore virtually none thru resistor 73. Thus op-amp 74 output voltage is then equal to the signal at its positive input, which is $v-v_f$.

To provide a negative polarity absolute value of the input signal, the anodes and cathodes of the two diodes are interchanged in the circuit.

Figure 10:
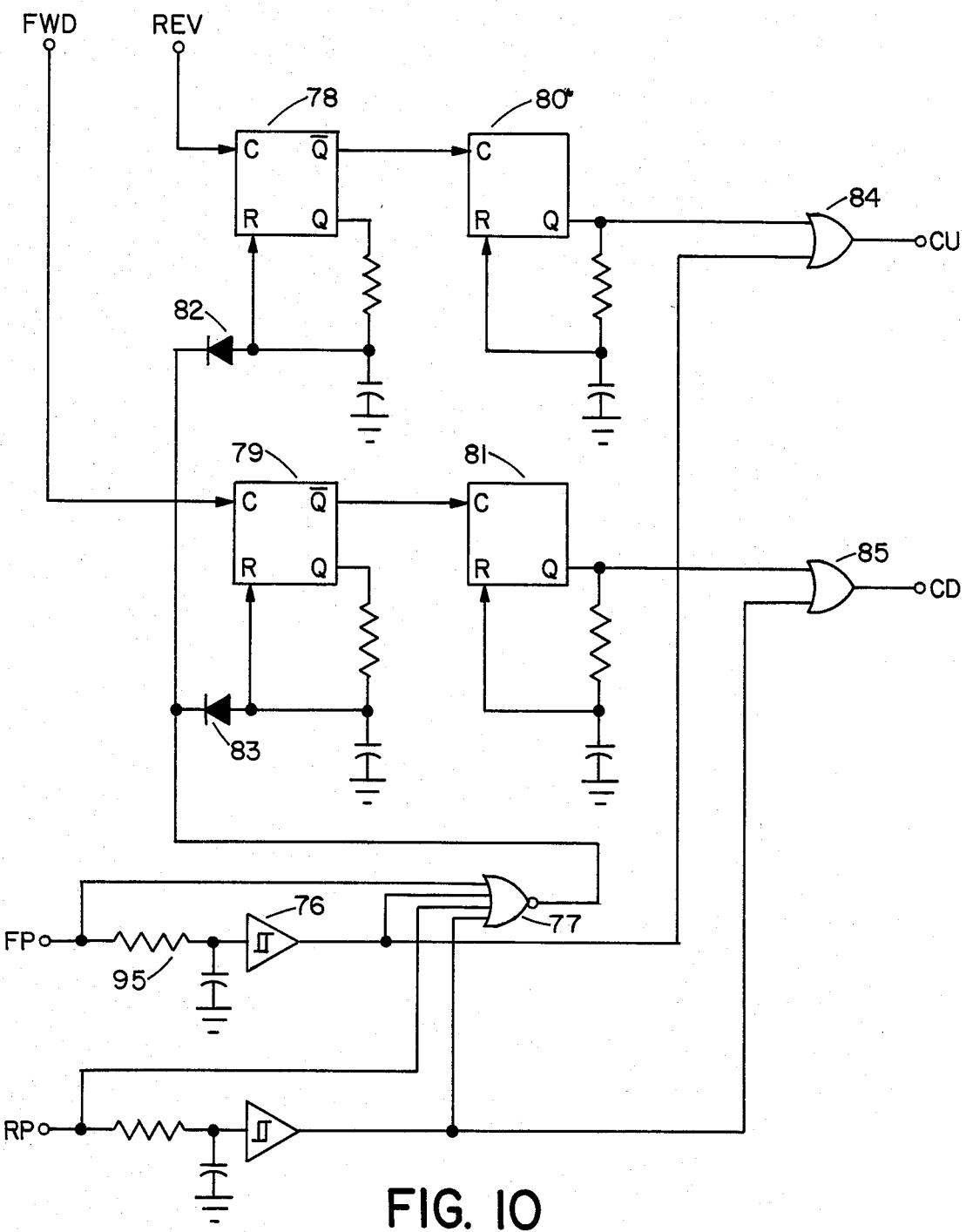
FIG. 10 shows pulse queuing means for presenting queued command and feedback pulses, with a prescribed minimum interval therebetween.

Pulse queuing means, shown in FIG. 10, prevents counting error that could otherwise occur due to occasional overlap between randomly coincident command and feedback pulses. It provides means for combining these asynchronous pulses, with a time interval therebetween that is always longer than a prescribed minimum. Representative pulse queuing means is presented input command pulses each of 4 microsecond duration, thru channel FP to effect forward rotation and thru channel RP to effect reverse rotation. Signal filter means 95 reject interference and present filtered pulses to Schmitt trigger means 76, which present 4 microsecond duration command pulses. The input command pulses and the delayed command pulses are presented to nor-gate 77, which dictates a queuing interval therefrom. The REV and FWD feedback pulses from the rotation discriminator trigger respective queuing monostables 78 and 79 which trigger, from the trailing edge of their output pulses that provides an extendable delay, respective pulse monostable means 80 and 81 which output a 1 microsecond duration pulse when triggered. The queuing interval dictated by nor-gate 77 thru respective diodes 82 and 83 to queuing monostables 78 and 79 extend their output pulse duration which is intrinsically 1 microsecond, so the trailing edge there of extended to the end of the queuing interval plus the intrinsic delay. Thus, the nominal 1 microsecond intrinsic delay provided by the queuing monostables is extendable to 8 microseconds maximum whenever it overlaps in the queuing interval accompanying each command pulse. This insures a minimum separation of 1 microsecond between the delayed command pulses from the Schmitt triggers and the queued feedback pulses from the pulse monostables. Therefore, the queued command and feedback pulses, which are respectively presented thru or-gates 84 and 85 to the CU and CD inputs of the up-/down counter, will never conflict with each other.

Figure 11:
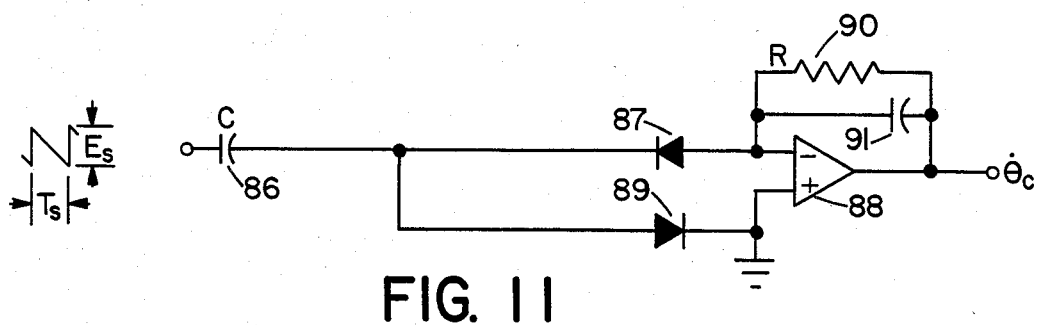
FIG. 11 shows a low-cost circuit for providing an analog speed command, proportional to a command pulse rate, from the slope interval of its sawtooth interpolation signal.

A circuit for providing analog speed command $\dot{\theta}_c$ from a sawtooth interpolation signal of a command pulse rate is shown in FIG. 11, wherein: The sawtooth waveform, having a constant peak-to-peak amplitude $E_s$ (volts) and a period $T_s$ (milliseconds), is presented to input capacitor 86 having a value C (nanofarads). During the slope interval of the sawtooth waveform, input diode 87, having a relatively low forward conduction voltage $v_f$, conducts average input current from the capacitor, equivalent to $C(E_s-2v_f)/T_s$ (microamperes) into the negative input of op-amp 88. Diode 89 provides a discharge path for capacitor 86 during positive transitions of the sawtooth waveform, which are much short than the slope intervals. Feedback resistor 90 having a value R (megohms) scales the analog speed command so $\dot{\theta}_c = RC(E_s-2v_f)/T_s$ (average volts). Capacitor 91 minimizes ripple of the analog speed command, which is inherently minimal if sawtooth waveform transitions are relatively brief and diode forward conduction voltage is relatively low.

Figure 12:
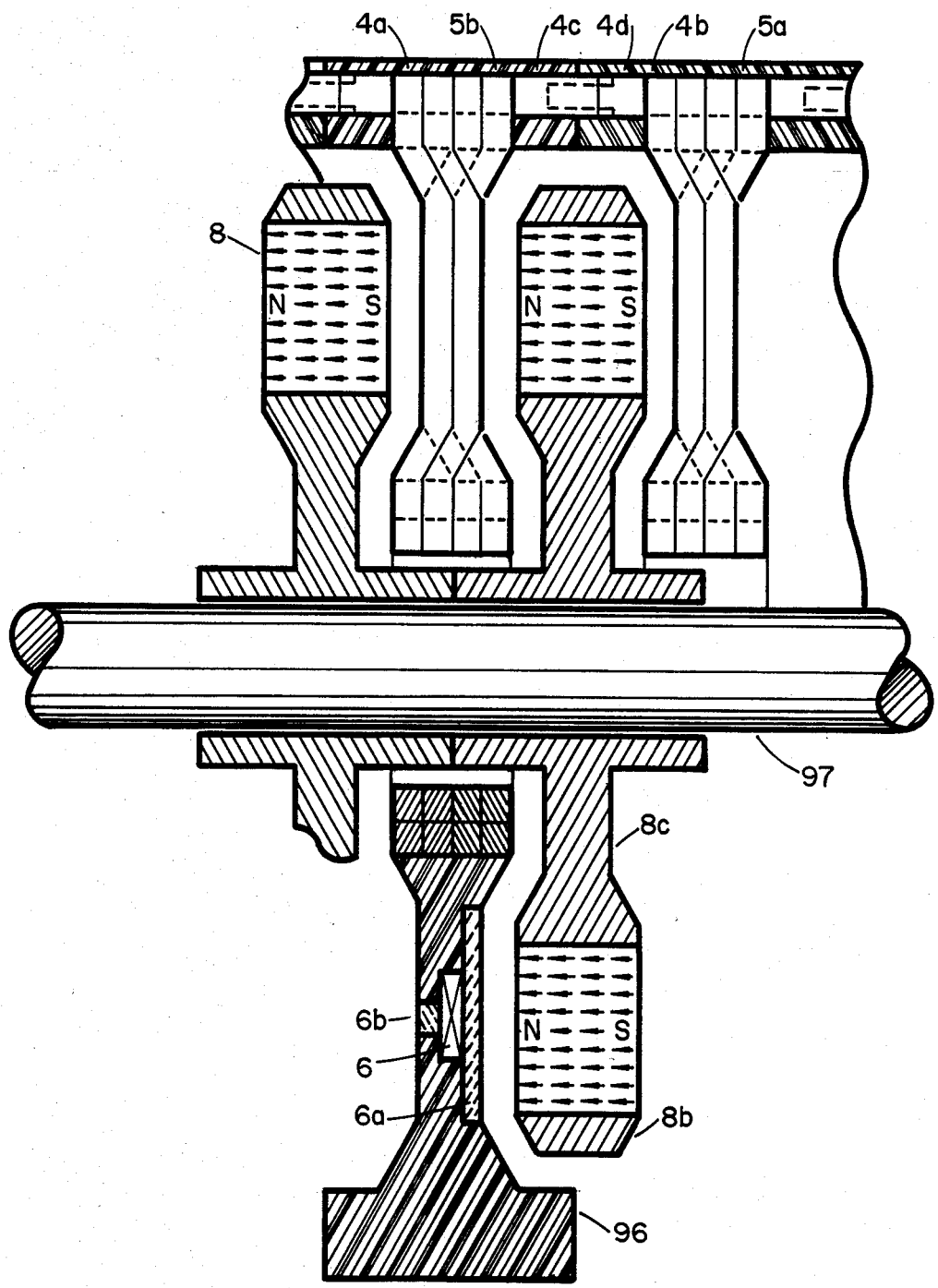
FIG. 12 illustrates a partial cross section, thru the rotor axis, of an axial-field permanent-magnet rotor and 2-phase stator with one of two Hall-effect transducers and flux-collection means therefor.

The cross-sectional view in FIG. 12 illustrates basic parts juxtaposition and geometry of a representative 2-phase axial-field permanent-magnet motor. Stator windings 4a and 5b are shown nested together in one stator ring, and windings 4b and 5a in another. The end of winding 4a is electrically connected to termination 4c, which is shown as an outer concentric pressure contact to inner termination 4d, which makes electrical contact to the start of winding 4b. Like pressure contact provides series connection to like windings of successively stacked stator rings.

Hall-effect transducer 6, which provides one of the transducer signals, is shown between flux-collection means 6a and 6b, which hav high magnetic permeability for collecting flux and concentrating it at the small transducer. Ferromagnetic bar 6a has length and breadth approximating that of a radial group of conductor segments, so it intercepts roughly the same amount of rotor flux as radial groups of stator conductors comprising a corresponding phase. Ferromagnetic block 6b completes a concentrated flux path thru the transducer, with bar 6a increasing the flux density thereat by a factor of 2 at least, and causing flux to vary in proportion to the flux thru the radial conductors of the corresponding phase. The bar and block are preferably linear ferrite in motors with typical ceramic rotor magnets, and are thin ferromagnetic laminations in motors with samarium-cobalt or other high-strength rare-earth magnets.

To the extent that the transducer signal waveforms are thus matched to the emf of the corresponding stator windings, and stator current waveforms comply with respective transducer signals, stator emf and current have matching waveforms, to minimize harmonic current that does not effectively produce torque but otherwise adds to total power losses.

The rotor has permanent-magnet rings 8, with magnetic orientation as indicated by symbols N for a North pole and S for a South pole, held concentrically between rim 8b and hub 8c, each like assembly constituting a rotor disk.

The rims are preferably aluminum, selected mainly for its non-ferromagnetic properties, zero hysteresis loss, low power loss from eddy currents because it has low resistivity, and its high tensile strength. Each rim is slightly pre-stressed to counteract the centrifugal forces of thereby banded permanent-magnet material which generally has low tensile strength and is thus by itself not consistent with the high speeds necessary to maximize power-to-weight ratio and efficiency. Pre-stress is achieved by accurately positioning each pre-heated rim around a respective permanent-magnet ring and cooling the rim, so the resulting tight fit holds the two parts securely together.

Each side of the permanent-magnet rings are flat, precisely dimensioned, and have parallel faces, achieved by surface grinding of each side. Inner and outer diameters are precisely dimensioned, round, and non concentric with each other, achieved by centerless grinding.

Rotational alignment between successively stacked rotor disks (and end-disks) and perpendicularity of each relative to rotor shaft 97 is maintained by the hubs, which transmit torque therefrom to the shaft. They are preferably molded plastic having good dimensional stability, or they can be aluminum or other light-weight non-ferromagnetic metal, preferably bonded to the permanent-magnet rings by a thixotropic plastic adhesive.

Many other known materials, processes, and combinations are also available.

For a typical multiple-turn two-layer stator winding, wire-forming begins at the middle of a length of insulated copper conductor preferably having a square cross-section, having a first and second half which become respective first and second layers by the forming process; whereby bending of the first half progresses in a plane normal to the axis of a stator ring thus progressively formed, from an inner arc segment with the second half extending therefrom along an axial line. Forming of the first half progresses along a radially outward segment, then along an outer arc segment, then along a radially inward segment, then along an inner arc segment, and repeating this progression to encircle the stator ring the desired number of turns for the layer thus formed, with said first layer of the conductor terminating at an outer arc. Said second half of the conductor is then likewise formed in an adjacent plane, progressing from the inner arc, which maintains continuity between the first and second layers, in a direction opposite the progression of the first half, with said second half also terminating at an outer arc.

The two-layer winding thus formed has an axial width equivalent to the sum of the cross-sections of the two adjoining layers. By axially offsetting the inner and outer arc segments from the radial segments an amount slightly more than the thickness of one layer, the windings of the two respective phases in a stator ring can be nested one with the other, the nested windings thus having an axial width across the radial segments equivalent to the width for a single two-layer winding.

A full 3-phase stator ring with an equivalent width across the radial segments would contain: a winding without axial offset, nested between a winding with its arc segments offset axially an amount slightly more than its width, and another winding with its arc segments axially offset an opposite like amount. One of the 3-phase stator rings has three similar windings, each with one less outer arc segment group and two less radial groups of conductors, to accommodate three Hall-effect transducers in the spaces thereby reserved.

Windings 4b and 5a, each having accessible terminations at their start and end, are nested together and molded into an integral modular stator ring in a non-ferromagnetic matrix material having very high electrical resistivity, high thermal conductivity, and dimensional stability to maintain physical clearance with all parts of the rotor in its intended environment. Various plastics mixed with small particles of a thermally conductive material such as aluminum, copper, or alumina can be molded with the windings to meet these requirements.

Stator rings are subjected to strong alternating magnetic fields by a revolving rotor field, plus generally weaker magnetic fields from alternating stator currents; so hysteresis and eddy loss in the material is an important consideration. The insulated copper windings therein have a low permeability, characteristic of non-ferromagnetic materials, which like the matrix material, is fairly close to the permeability of a vacuum; so, for brevity, the motor is called coreless, in that it does not have a ferromagnetic core to provide a high permeability path thru the stator.

If the windings were molded in a matrix material having high permeability, conventional cogging ue to reluctance torque would be substantial, and therefore troublesome to most servomechanism applications.

Plastics such as nylon are non-ferromagnetic so they do not incur hysteresis loss, and are nonconductive so they do not incur eddy currents. Alumina is electrically nonconductive and has fair thermal conductivity. Fine particles of aluminum or copper, insulated from each other by the plastic matrix, do not incur significant eddy currents and loss therefrom is negligible. Heat transfer thru the matrix is greatly increased by the addition of either type of particles, resulting in prodominantly conductive heat transfer from the stator windings to the outside surface of the motor for maintaining stable stator temperatures.

Windings 4a and 5b are likewise nested together, and with transducers 6 and 7 and the flux-collection means therefor are likewise molded into an integral stator ring in matrix 96.

Forming the stator windings in accordance with this specific geometric design facilitates placement of a maximum volume of copper conductors in the space available for effective interaction with the axial field pattern of the rotor, to maximize torque vs. resistance and consequently motor power vs. copper loss.

Since most of the dissipation in the motor is due to copper loss, most of the motor heating occurs within the windings, which have a subtantial area very close to an outside surface from which heat can be easily removed. In applications such as the flywheel storage battery, the only practical surface for stator heat removal is the outside, because the rotor spins coupled to a flywheel, magnetically levitated in a hermetically sealed vacuum inclosure, with radiation as the dominant heat transfer mode from the spinning parts. The stator rings are preferably sealed by an adhesive therebetween, and with an outside end inclosure likewise sealed, provide part of the vacuum inclosure. The side from which the rotor shaft is coupled to the flywheel is likewise sealed to its inclosure, thus providing a continuous vacuum for the rotor and flywheel. In addition to ultra-high efficiency, negligible rotor heating and predominantly conductive heat transfer in the stator is crucial, because conventional rotor and interior cooling methods generally require forced air convection that is not possible in a vacuum. The controller can be located wherever convenient outside the evacuated inclosure, connected to the stator windings and transducers thru hermetic seals.

In accordance with the spirit of this disclosure, it is intended that the representative parameters and embodiments specifically described not be considered in any sense limiting, especially with regard to controller voltage and power levels, polarities and amplitudes of signals and reference levels, switching rate, number of phases, equivalent logic and digital implementations, equivalent signal processing, motor dimensions, number of poles, number of stator rings and rotor disks, rotor speed limits, and materials.

Accordingly, I claim:

1. Cooperative with a polyphase synchronous motor in a servomechanism for providing regenerative motion control, a switching controller, responsive to various input commands and to polyphase transducer signals that vary sinusoidally with rotor angle and correspond to respective stator phases, for synchronously controlling polyphase stator current; including in combination:
   means for deriving, from the transducer signals, the instantaneous magnitudes, polarities, and frequency thereof;
   signal interface means, responsive to various input command signals, and variously, to the instantaneous magnitudes, polarities, and frequency, for providing a torque amplitude signal, and variously, binary forward drive, reverse drive, and brake commands;
   multiplier means, responsive to the instantaneous magnitudes and to the torque amplitude signal, for providing respective synchronized amplitude control signals;
   a high-frequency power switching circuit, having power switching transistors which are selectively switched at a variable duty-cycle, for effecting controlled alternating stator currents;
   current sensors, having current transformers with primary windings in series with respective power switching transistors, for providing inductively coupled current feedback pulses proportional to instantaneous current thru the respective transistors;
   oscillator means, that provide a high-frequency squarewave signal;
   pulse control means, for initiating, from the squarewave signal, staggered pulses each having a restricted duty-cycle, and each having a variable duration dictated by the respective synchronized amplitude control signal and the corresponding current feedback pulse;
   switching logic, responsive to the staggered pulses, to said polarities, and to the binary commands, for controlling the selection and duty-cycle of said transistors;
   means for sourcing and sinking dc power and high-frequency current.

2. In a controller according to claim 1, a high-frequency power switching circuit, for effecting controlled alternating stator currents; comprising:
   a power filter capacitor, connected across dc terminals of the dc power source and sink;
   four power switching transistors, in a transistor bridge having two ac nodes, a dc node connected to one of said dc terminals, and a dc node connected thru a primary winding of a current transformer to the opposite dc terminal;
   four free-wheeling diodes, in a diode bridge having ac nodes connected to respective ac nodes of the transistor bridge and having dc nodes connected across the dc terminals;
   an inductor, in series with a stator winding, connected across the ac nodes;
   another transistor bridge, diode bridge, and inductor, likewise connected to the dc terminals and to another stator winding.

3. In a controller according to claim 1, a high-frequency power switching circuit, for effecting controlled alternating stator currents; comprising:
   a power filter capacitor, connected across dc terminals of the dc power source and sink;
   two power switching transistors, constituting a first half of a transistor bridge, having an ac node at each end, and a dc node at its center connected to a dc terminal;
   another two transistors, each in series with a respective primary winding of a current transformer, constituting a second half of the transistor bridge, having ac nodes connected to respective ac nodes of the first half, and a dc node at its center connected to the opposite dc terminal;
   four free-wheeling diodes, in a diode bridge having ac nodes connected to respective ac nodes of the transistor bridge and having dc nodes connected across the dc terminals;
   an inductor, in series with a stator winding, connected across the ac nodes;
   another transistor bridge, diode bridge, and inductor, likewise connected to the dc terminals and to another stator winding.

4. In a controller according to claim 1, current sensors, for providing inductively coupled current feedback pulses with amplitude proportional to instantaneous current through respective power switching transistors; each comprising:
   a current transformer, for providing inductively coupled current pulses with amplitude proportional to instantaneous current thru the associated power switching transistors;
   a resistive element, connected across the secondary winding of the transformer, with one end at signal ground;
   a diode, connected at one end to the secondary winding and at the other end to the current sensor output;
   a capacitor, connected at one end to said output and at the other end to the signal ground;
   a resistor, in parallel with the capacitor.

5. In a controller according to claim 1, pulse control means, for initiating, from the squarewave signal, staggered pulses each having a restricted duty-cycle, and each having a variable duration dictated by the respective synchronized amplitude control signal and the corresponding current feedback pulse; comprising:
   first bistable means, for initiating a pulse when set and ending the pulse when reset;
   means for setting the first bistable, after a brief delay following each odd transition of the squarewave signal;
   means for resetting the first bistable, on the odd transitions;
   first comparator means, for resetting the first bistable when a current feedback pulse from a first current sensor overtakes a first synchronized amplitude control signal;
   second bistable means, for initiating a pulse when set and ending the pulse when reset;
   means for setting the second bistable, after a brief delay following each even transition of the squarewave signal;

means for resetting the second bistable, on the even transitions;

second comparator means, for resetting the second bistable when a current feedback pulse from a second current sensor overtakes a second synchronized amplitude control signal.

6. In a controller according to claim 1, speed sensor means, for deriving from the polyphase transducer signals a continuous analog speed feedback signal proportional to the instantaneous frequency thereof; comprising:

means for deriving time-derivatives of each respective sinusoidal transducer signal;
means for squaring the respective time-derivatives;
means for summing the squares;
means for extracting the square-root of the sum.

7. In a controller according to claim 1, a speed sensor circuit, for deriving from the polyphase transducer signals a continuous analog speed feedback proportional to the instantaneous frequency thereof; comprising:

first and second op-amp means;
a plurality of like capacitors, each presented a respective transducer signal;
a plurality of diode pairs, each for conducting current from a respective capacitor, during odd half-cycles of the respective transducer signal to the input of the first op-amp, and during the even half-cycles to the input of the second op-amp;
a resistor, across the first op-amp input and output;
a like resistor, one end connected to the first op-amp output, and the other end to the second op-amp input;
a feedback network, across the second op-amp input and output.

8. In a controller according to claim 1, rotation discriminator means, responsive to the polarities of the transducer signals, designated S1 thru S4, for presenting pulses at a first output each indicating a forward-rotation polarity transition, and pulses at a second output each indicating a reverse-rotation polarity transition; comprising:

first thru fourth monostable means, for producing a pulse indicating a forward-rotation polarity transition at one of four edge-triggered inputs responsive to S1, S2, S3, and S4, respectively, when an enabling polarity is present at a respective enable input responsive to S4, S3, S1, and S2, respectively;
fifth thru eighth monostable means, for producing a pulse indicating a reverse-rotation polarity transition at one of four edge-triggered inputs responsive to S1, S2, S3, and S4, respectively, when an enabling polarity is present at a respective enable input responsive to S3, S4, S2, and S1, respectively;
logic means for presenting a pulse at the first output each time any of the first thru fourth monostables produces a pulse;
logic means for presenting a pulse at the second output each time any of the fifth thru eighth monostables produces a pulse.

9. In a controller according to claim 1, an absolute value circuit, for deriving the instantaneous magnitude of its input signal; comprising:

an op-amp;
first and second diodes, with the input signal presented to the cathode of one and to the anode of the other;
first and second resistors, each of equal resistance, each connected to the negative input of the op-amp, the other end of the first to the first diode, and the other end of the second to the op-amp output;
another resistor, one end connected to the second diode and to the positive input of the op-amp, and the other end to signal ground.

10. In a controller according to claim 1, means for deriving a position feedback analog interpolation signal from the transducer signals; comprising:

means for linearizing the magnitude of a transducer signal;
op-amp means, for providing therefrom a zero-centered triangular waveform function of rotor angle;
unity-gain inverting amplifier means, for providing a zero-centered triangular waveform of opposite polarity therefrom;
logic means, responsive to the polarities of each polyphase transducer signal, for providing binary signals therefrom;
analog switch means, responsive to the binary signals, for providing from the triangular waveforms a sawtooth function of rotor angle with transitions that coincide with the polarity transitions.

11. In a controller according to claim 1, signal interface means, for providing signals to control bidirectional rotor speed; comprising:

means for producing an analog speed command, proportional to desired rotor speed;
means for producing a negative braking signal, that varies with desired braking torque;
means for producing binary direction commands;
analog combiner means, for providing a speed error signal from the speed command minus the speed feedback;
override means, responsive to the speed error and the braking signal, for providing a torque control signal, which tracks the speed error when the braking signal is zero and when the speed error is the more negative, and tracks the braking signal when it is the more negative;
comparator means, for providing a binary drive command when the torque control signal is positive and a binary brake command when it is negative;
means for deriving a torque amplitue signal, that varies with the absolute value of the torque control signal.

12. In a controller according to claim 1, signal interface means, for providing signals to control rotor speed in compliance with a command pulse rate; comprising:

means for providing an analog speed command, proportional to the command pulse rate;
means responsive to the polarities of the transducer signals, for providing a feedback pulse rate proportional to rotor speed;
pulse queuing means, for presenting in addition to each of the feedback pulses each of the command pulses, with a prescribed minimum interval between the queued command and feedback pulses presented therefrom;
up/down counter means, responsive thru the pulse queuing means to the command pulses presented to one input and to the feedback pulses presented to another, for counting the difference thereof;
digital-to-analog converter means, for producing a digitally incremented speed error integral that varies with the accumulated count difference;

signal combiner means, for providing a torque control signal that varies with the analog speed command minus the analog speed feedback plus the speed error integral;

comparator means, for providing a binary drive command when the torque control signal is positive and a binary brake command when it is negative;

means for deriving a torque amplitude signal that varies with the absolute value of the torque control signal.

13. In a controller according to claim 12, feedback and command pulse interpolation means, for synthesizing a linearly variable speed error integral; comprising:

means for presenting to the signal combiner a sawtooth function of rotor angle, with peak-to-peak transitions each equivalent to a digital increment and coincident with a feedback pulse;

means for presenting to the signal combiner a sawtooth waveform, with peak-to-peak transitions each equivalent to a digital increment and coincident with a command pulse.

14. In a controller according to claim 12, means for providing the analog speed command, in response to a sawtooth waveform having a constant peak-to-peak amplitude with variable slope intervals between transitions coincident with the command pulses; comprising:

a capacitor, to which the sawtooth waveform is presented; an op-amp;

a diode, for conducting current thru the capacitor to the input of the op-amp during the sawtooth slope interval;

another diode, for conducting current thru the capacitor from the signal ground during the sawtooth transition;

a resistor, across the input and output of the op-amp;

a capacitor, in parallel with the resistor.

15. In a controller according to claim 1, signal interface means, for providing signals to control position in compliance with digital commands; comprising:

rotation discriminator means, responsive to the polarities of the transducer signals, for providing a feedback pulse at a first output resulting from each forward-rotation polarity transition and at a second output resulting from each reverse-rotation polarity transition;

bistable means, for providing continuous binary direction signals that are updated with each of the pulses;

up/down counter means, that count down due to a pulse at its first input and up due to a pulse at its second input;

means for presenting the feedback pulses from the first and second outputs of the rotation discriminator to the respective first and second counter inputs;

means for sensing a reference position and thereat presetting the counter means to a digital position command;

means for converting the digital output of the counter means to an analog position error signal;

analog switch means, responsive to the analog speed feedback and controlled by the binary direction signals, for providing a velocity feedback signal;

means for providing a torque control signal, which varies with the analog position error signal minus the velocity feedback;

means for deriving a torque amplitude signal, that varies with the absolute value of the torque control signal;

comparator means, for providing a binary forward drive command when the torque control signal is positive and a binary reverse drive command when it is negative.

16. In a controller according to claim 15, pulse-incremented motion control means, for controlling rotation thru an angle dictated by the number of command pulses presented to respective first and second channels, at a variable speed dictated by the command pulse rate; comprising:

means for presenting a variable number of command pulses at a variable rate, thru a first channel to effect forward rotation and thru a second to effect reverse;

pulse queuing means, for presenting in addition to each feedback pulse from the first and second outputs of the rotation discriminator to the respective first and second inputs of the up/down counter each pulse from the first channel to the second input and each pulse from the second channel to the first input with a prescribed minimum interval between the queued command and feedback pulses presented therefrom.

17. In a controller according to claim 15, feedback interpolation means, for synthesizing a linearly variable position feedback; comprising:

means for combining with the analog position error signal a sawtooth function of rotor angle, with peak-to-peak transitions each equivalent to a digital increment and each coinciding with a feedback pulse.

18. In a controller according to claim 15, interpolated pulse-incremented motion control means, for synthesizing a digital position control servomechanism with linear continuously variable commands and feedback; comprising:

means for presenting a variable number of command pulses, at a variable rate thru a first channel to effect forward rotation and thru a second to effect reverse;

pulse queuing means, for presenting in addition to each feedback pulse from the first and second outputs of the rotation discriminator to the respective first and second inputs of the up/down counter each pulse from the first channel to the second input and each pulse from the second channel to the first input with a prescribed minimum interval between the queued command and feedback pulses presented therefrom;

means for combining with the analog position error signal a sawtooth waveform, with peak-to-peak transitions each equivalent to a digital increment and each coinciding with a command pulse;

means for combining with the analog position error signal a sawtooth function of rotor angle, with peak-to-peak transitions each equivalent to a digital increment and each coinciding with a feedback pulse.

19. In a controller according to claim 15, self-programming means, for producing digital readouts to record consecutive positions reached by manual positioning; comprising:

means for inhibiting the drive commands;

means for interchanging the first and second inputs to the up/down counter;

reset means, for clearing the up/down counter means to zero prior to departing from each consecutive position;

means for manually rotating the rotor to each consecutive position;

signal lines from the digital output of the up/down counter means, for presenting sequential digital readouts of each consecutive position.

20. In a controller according to claim 15, self-programming means, for producing digital readouts to record consecutive positions reached by pulse-increment positioning control; comprising:

pulse-incremented positioning control means, for presenting a variable number of command pulses at a variable rate, from a first channel to the second input of the up/down counter for effecting forward rotation, and from a second channel to the first input for reverse;

means for determining when the servomechanism has reached a reference position and subsequent consecutive positions;

like up/down counter means, that count up with each pulse from the first output of the rotation discriminator and down with each pulse from the second output, for providing sequential digital readouts indicating the direction and amount of rotation from the reference to the first position and from one consecutive position to the next;

reset means, for clearing the like up/down counter means to zero prior to departing from each consecutive position.

21. In a controller according to claim 15, means for limiting slewing speed; comprising:

means for providing a reference signal representing maximum desired slewing speed;

means for producing an amplified difference between the reference and the speed feedback when the speed feedback reaches the reference;

signal combiner means, for subtracting the amplified difference from the torque amplitude signal.

22. In a controller according to claim 15, pulse queuing means, for presenting, in addition to each feedback pulse from the first and second outputs of the rotation discriminator to the respective first and second inputs of the up/down counter, each pulse from a first channel to the second input and each pulse from a second channel to the first input, with a prescribed minimum interval between the queued pulses presented therefrom; comprising:

first and second channels, for presenting input command pulses;

first and second signal filters, which receive input command pulses from the respective first and second channels, for rejecting interference and presenting filtered pulses;

first and second Schmitt triggers, each respectively responsive to the filtered pulses, for presenting delayed command pulses, each delayed from a respective input command pulse an interval that is less than the pulse duration;

nor-gate means, responsive to the input and the delayed command pulses, for dictating a queuing interval from the leading edge of each input command pulse to the trailing edge of each delayed command pulse;

first and second queuing monostables, for extendably delaying each feedback pulse from respective first and second outputs of the rotation discriminator, with a brief intrinsic delay extended beyond a queuing interval if overlapping therewith;

first and second pulse monostables, responsive to the respective extendably delayed feedback pulses, for presenting queued feedback pulses each having a duration that is less than the delay between the input command pulses and the delayed;

first or-gate means, for presenting the delayed command pulses and the queued feedback pulses from the first Schmitt trigger and second pulse monostable, respectively, to the second input of the counter;

second or-gate means, for presenting the delayed command pulses and the queued feedback pulses from the second Schmitt trigger and first pulse monostable, respectively, to the first input of the counter.

23. In a servomechanism according to claim 1, with the rotor coupled to a magnetically levitated flywheel in a vacuum, signal interface means for providing signals to control power storage and regeneration; including:

means for providing a voltage feedback signal proportional to the voltage across the dc power source and sink;

means for providing a dc reference;

means for providing a torque amplitude signal which varies with the difference between the voltage feedback and the dc reference;

means for providing a drive command when the voltage feedback exceeds the dc reference and the speed feedback is below a prescribed level, and for providing a brake command when the voltage feedback is less than the dc reference.

24. Cooperative with a switching controller in a servomechanism for providing regenerative motion control, a polyphase synchronous motor, which provides polyphase transducer signals that each vary sinusoidally with rotor angle in synchronism with the emf of a corresponding stator winding, for producing bidirectional torque proportional to synchronously controlled polyphase stator current and polyphase emf proportional to rotor speed; including in combination:

two permanent-magnet rotor end-disks, each providing at one face a pattern of evenly distributed alternating poles from merged looping tangential magnetized paths therein;

permanent-magnet rotor disks, each providing at both faces a like number of evenly distributed alternating poles from axially magnetized paths therethru;

rotatable means for holding a coaxial stack of the rotor disks and end-disks, each affixed to every other with axial spaces therebetween having an aligned axial magnetic field pattern that rotates therewith;

a stator ring, containing polyphase stator windings, and corresponding polyphase transducers which each provide a sinusoidal signal that varies with the axial magnetic field thereat, cemented together in a molded non-ferromagnetic matrix;

stator rings, each containing polyphase stator windings cemented together in a molded non-ferromagnetic matrix;

means for holding a coaxial stack of the stator rings, each fixed to a motor mount, such that corresponding phases are in alignment, and the stator windings and transducers juxtaposed to the rotor disks and end-disks in respective alternation therewith in the axial spaces therebetween.

25. In a motor according to claim 24, a stator ring containing 2-phase stator windings and Hall-effect transducers; comprising:
   a first winding, constituted by a length of insulated conductor progressively bent between inner and outer concentric arcs of the ring, forming a repeating pattern of unbroken radial and arc segments, the radial segments in groups numbering two less than the rotor poles and having like center-to-center spacing, the arc segments axially offset from the radial by half the axial width, for conducting phase 1 stator current and contributing to phase 1 emf;
   a second winding, likewise constituted and formed, for conducting phase 2 stator current and contributing to phase 2 emf;
   two linear Hall-effect transducers, with center-to-center spacing half that of the poles, symmetrically disposed within a space reserved from the two windings, for providing 2-phase sinusoidal signals that vary with the axial magnetic field thereat;
   a non-ferromagnetic matrix, for containing the two stator windings nested together and the two transducers in respective phase alignment therewith, cemented together and molded into a ring having axially accessible terminations.

26. In a motor according to claim 24, stator rings each containing 2-phase stator windings; comprising:
   a first winding, constituted by a length of insulated conductor progressively bent between inner and outer concentric arcs of the ring, forming a repeating pattern of unbroken radial and arc segments, the radial segments in evenly spaced groups numbering the same as the number of poles, the arc segments axially offset from the radial by half the total width, for conducting phase 1 stator current and contributing to phase 1 emf;
   a second winding, likewise constituted and formed, for conducting phase 2 stator current and contributing to phase 2 emf;
   a non-ferromagnetic matrix, for containing the two windings nested together and molded into a ring having axially accessible terminations.

27. In a stator ring according to claim 25, flux-collection means, for concentrating the magnetic field of the rotor thru the transducers and for matching the signal waveform of each transducer with the emf of the corresponding stator winding; each comprising:
   a ferromagnetic bar having relatively high permeability, its length and breadth approximating that of a radial group of conductors and its width about one-third that of the radial group, in a corresponding angular position to its respective phase and aligned with an adjoining Hall-effect transducer;
   a ferromagnetic block having a relatively high permeability, its length and breadth each approximating the breadth of the bar and its width about equal to that of the bar, aligned with and adjoining the opposite side of the Hall-effect transducer.

* * * * *